(12) United States Patent
Hao et al.

(10) Patent No.: US 11,057,321 B1
(45) Date of Patent: Jul. 6, 2021

(54) INFORMATION PROCESSING METHOD AND DEVICE

(71) Applicant: BEIJING SOGOU TECHNOLOGY DEVELOPMENT CO., LTD., Beijing (CN)

(72) Inventors: Qianqian Hao, Beijing (CN); Maerhufu Mansuer, Beijing (CN); Xin Cui, Beijing (CN); Yang Zhang, Beijing (CN)

(73) Assignee: BEIJING SOGOU TECHNOLOGY DEVELOPMENT CO., LTD., Beijing (CN)

( * ) Notice: Subject to any disclaimer, the term of this patent is extended or adjusted under 35 U.S.C. 154(b) by 159 days.

(21) Appl. No.: 15/577,530

(22) PCT Filed: May 6, 2016

(86) PCT No.: PCT/CN2016/081269
§ 371 (c)(1),
(2) Date: Sep. 13, 2018

(87) PCT Pub. No.: WO2016/192509
PCT Pub. Date: Dec. 8, 2016

(30) Foreign Application Priority Data

May 29, 2015 (CN) .......................... 201510290630.1

(51) Int. Cl.
*H04L 12/58* (2006.01)
*G06F 16/951* (2019.01)
(52) U.S. Cl.
CPC ............ *H04L 51/04* (2013.01); *G06F 16/951* (2019.01)

(58) Field of Classification Search
None
See application file for complete search history.

(56) References Cited

U.S. PATENT DOCUMENTS 9,199,171 B2 * 12/2015 Mizuki .............. H04N 21/4312
2003/0028873 A1 * 2/2003 Lemmons .......... H04N 7/17318
725/36

(Continued)

FOREIGN PATENT DOCUMENTS

CN 103559627 A 2/2014
CN 103853446 A 6/2014

(Continued)

OTHER PUBLICATIONS

The World Intellectual Property Organization (WIPO) International Search Report for PCT/CN2016/081269 Jul. 26, 2016 5 Pages.

*Primary Examiner* — Cai Y Chen
(74) *Attorney, Agent, or Firm* — Anova Law Group, PLLC

(57) ABSTRACT

An information processing method and device for simplifying the operation process. The method comprises: in a process of performing interaction via a pre-configured messaging mode, acquiring interaction information sent by an opposite end; determining a preset triggering condition that matches the interaction information through analysis, and acquiring corresponding display information; and recommending the display information corresponding to the matched preset triggering condition. The information that the user may be interested in during the interaction process is directly recommended and displayed, such that the operation process is simplified, and the efficiency is improved.

20 Claims, 12 Drawing Sheets

---

In a process of performing interaction via a pre-configured messaging mode, acquiring interaction information sent by an opposite end — 102

↓

Determining a preset triggering condition that matches the interaction information through analysis, and acquiring corresponding display information — 104

↓

Recommending the display information corresponding to the matched preset triggering condition — 106

(56) References Cited

U.S. PATENT DOCUMENTS

2004/0194141 A1\* 9/2004 Sanders ............ H04N 5/44543
 725/53
2008/0120160 A1 5/2008 Woo et al.

FOREIGN PATENT DOCUMENTS

| CN | 104142964 A | 11/2014 | |
|---|---|---|---|
| CN | 104917669 A | 9/2015 | |
| WO | WO-2014198132 A1 \* | 12/2014 | ........... G06F 16/951 |

\* cited by examiner

INFORMATION PROCESSING METHOD AND DEVICE

CROSS-REFERENCES TO RELATED APPLICATIONS

This application is a national phase entry under 35 U.S.C § 371 of International Application No. PCT/CN2016/081269, filed on May 6, 2016, which claims priority of Chinese Patent Application No. 201510290630.1, entitled "Information processing method and device", filed with the State Intellectual Property Office of P. R. China on May 29, 2015, the entire contents of which are incorporated herein by reference

FIELD OF THE DISCLOSURE

The present disclosure generally relates to the technical field of data processing and, more particularly, relates to an information processing method and an information processing device.

BACKGROUND

When interacting with each other via an instant messaging mode, the users may send each other interaction information to realize instant messaging interaction. If one of the users is interested in the interaction content during the interaction process, for example, the user wants to retrieve certain content, he or she often needs to exit the instant messaging application and open a browser to input desired content via an input method to carry out searching. The processing procedure can be relatively tedious.

BRIEF SUMMARY OF THE DISCLOSURE

Embodiments of the present disclosure are directed to solving the above-described technical issues by providing an information processing method, so as to simplify the operational procedure.

Correspondingly, embodiments of the present disclosure further provide an information processing device, configured to ensure the implementation and application of the aforementioned method.

To solve the above-described issues, embodiments of the present disclosure disclose an information processing method, comprising: in a process of performing interaction via a pre-configured messaging mode, acquiring interaction information sent by an opposite end; determining a preset triggering condition that matches the interaction information through analysis, and acquiring corresponding display information; recommending the display information corresponding to the matched preset triggering condition.

Embodiments of the present disclosure further disclose an information processing method, comprising: in a process of performing interaction via a pre-configured messaging mode, acquiring interaction information generated by a local end; determining a preset triggering condition that matches the interaction information through analysis, and acquiring corresponding display information; recommending the display information corresponding to the matched preset triggering condition.

Embodiments of the present disclosure further disclose an information processing device, comprising: an opposite end acquiring module, configured to, in a process of performing interaction via a pre-configured messaging mode, acquire interaction information sent by an opposite end; a first analyzing module, configured to, determine a preset triggering condition that matches the interaction information through analysis, and acquire corresponding display information; and a first recommending module, configured to, recommend the display information corresponding to the matched preset triggering condition.

Embodiments of the present disclosure further discloses an information processing device, comprising: a local end acquiring module, configured to, in a process of performing interaction via a pre-configured messaging mode, acquire interaction information generated by the local end; a second analyzing module, configured to, determine a preset triggering condition that matches the interaction information through analysis, and acquire corresponding display information; and a second recommending module, configured to, recommend the display information corresponding to the matched preset triggering condition.

Embodiments of the present disclosure further disclose a program, comprising a readable code. When the readable code runs in a computing device, the computing device may execute the information processing method described based on embodiments of the present disclosure.

Embodiments of the present disclosure further discloses a readable medium for storing the program illustrated in embodiments of the present disclosure.

With respect to the existing technologies, embodiments of the present disclosure have the following advantages.

Ina process of performing interaction via a pre-configured messaging mode, the interaction information sent by an opposite end may be acquired. A preset triggering condition that matches the interaction information is determined through analysis, and the display information corresponding to the matched preset triggering condition is recommended. The display information possibly needed by the users may be directly recommended for selection by the users, and the information in which the users may be possibly interested during the interaction process may be recommended directly and be further displayed. Thus, the operation process is simplified, and the efficiency is improved.

DETAILED DESCRIPTION

To make the above objectives, features, and advantages of the present disclosure more apparent and easier to understand, the present disclosure will be illustrated more fully hereinafter with reference to the accompanying drawings and specific implementations.

The primary principle of the present disclosure is to provide an information processing method so as to simplify the operation process. In a process of performing interaction via a pre-configured messaging mode, the interaction information sent by an opposite end may be acquired. A preset triggering condition that matches the interaction information is determined through analysis, and the display information corresponding to the matched preset triggering condition is determined. The display information possibly need by the user may be directly recommended for selection by the users and further, the display information may be entered on screen for display based on a triggering command of the user, and the information in which the users may be possibly interested during the interaction process may be recommended directly and be further displayed. Thus, the operation process is simplified, and the efficiency is improved.

Embodiment 1

Figure 1:
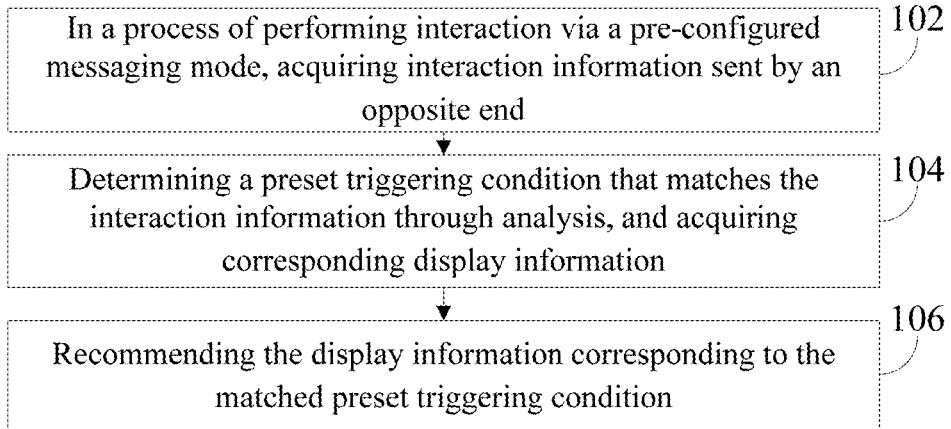
FIG. 1 illustrates a step flow chart of an information processing method based on opposite end information provided by embodiments of the present disclosure.

Referring to FIG. 1, a step flow chart of an information processing method based on opposite end information provided by embodiments of the present disclosure is illustrated, which may specifically comprise the following steps:

Step 102, in a process of performing interaction via a pre-configured messaging mode, acquiring interaction information sent by an opposite end.

In embodiments of the present disclosure, the pre-configured messaging mode may include at least one of the following: an instant messaging mode and a short message mode. Optionally, other messaging modes for execution of interaction may be included, and the present disclosure is not limited thereto. In particular, the instant messaging is a real-time messaging mode that allows two or more people to use the network for real-time delivery of the word message, file, voice and video communication. The short message is a type of telecommunication service that delivers short messages such as words and digits via the signaling channel and the signaling network of the mobile communication system, which belongs to the non-real time and non-audio data communication service. In a process where the users interact through the instant messaging mode or the short message mode, often an input method is applied to perform input of the word information, and the word information may be sent to a current messaging application for implementation of interaction.

The interaction information sent by the opposite end, such as the word information sent by the other end used by the instant messaging to perform chat interaction in an interaction window or a chat window, may be acquired in the interaction process. In one example, given an application of a recommendation platform in a terminal device, the application may acquire interaction information. Or, the interaction information may be acquired via an input method in the terminal device. Various bodies and approaches may be applied to acquire the interaction information, and the present disclosure is not limited thereto.

Step 104, determining a preset triggering condition that matches the interaction information through analysis, and acquiring corresponding display information.

Step 106, recommending the display information corresponding to the matched preset triggering condition.

The present disclosure may preset the triggering condition corresponding to the display information, and the preset triggering condition may be configured to trigger the matching and pushing of the display information, where the triggering condition may be distributed by a server or may be pre-configured or pre-stored in a local end. Further, the locally stored triggering condition may be edited, for example, the locally stored triggering condition may be added, deleted or altered, etc., and embodiments of the present disclosure are not limited thereto. By analyzing the interaction information, the preset triggering condition that matches the interaction information is determined, and the display information corresponding to the preset triggering condition is acquired. The display information is recommended and displayed in the current terminal for selection by the user. In the present disclosure, the non-entered-on-screen information in each input process may match one or more display information that is recommended.

For example, regarding the application installed by the recommendation platform in the terminal, after the display information is matched based on the interaction information, the application may configure a recommendation display region in the terminal and display the display information in the recommendation display region. Optionally, in the example of the input method, the display information may be recommended in regions such as the candidate region or the associative region of the input method. If the user is interested in the display information, the display information may be entered on screen for display through a triggering command. For example, the display may be carried out in a current instant messaging application program of the terminal, and the content entered on screen for display may be such display information or may be other information related to the display information. In one example, the display information may be webpage link information, and a webpage corresponding to the webpage link information, etc. may be entered on screen for display. Further, in the example of the input method, recommendation in the candidate region or the associative region of the input method is to use the display information as one of the candidates for recommendation to the user, and is an intermediate step in the input process of the input method. Accordingly, the location recommended for display may be the interface region of the input method. In the subsequent entered-on-screen display, the display information may be used as an output value of the input method for output, such that the location of the entered-on-screen display may be a non-input method application region. For example, if the application that the current input method is outputted to is an instant messaging application, then the display is within the instant messaging application. In one specific example, when a user A sends information of "你认识'犇'这个字吗 (do you know the word '犇 (bēn in Chinese pinyin)')" to a user B in the instant messaging application, an application used by the user B, such as an input method, may acquire and use the information as interaction information to obtain the display information of "犇 (bēn)" through analysis. Further, the display information of "犇 (bēn)" may be recommended in the recommendation display region of the application used by the user B as hint for the user.

As such, in a process of performing interaction via a pre-configured messaging mode, the interaction information sent by an opposite end may be acquired. A preset triggering condition that matches the interaction information is determined through analysis, and the display information corresponding to the matched preset triggering condition may be recommended. The display information possibly need by the users may be directly recommended for selection by the users, and the information in which the users may be possibly interested during the interaction process may be recommended directly and be further displayed. Thus, the operation process is simplified, and the efficiency is improved.

Embodiment 2

On basis of the aforementioned embodiments, detailed descriptions of the present implementation are provided based on a matching method of the interaction information sent by the opposite end.

Figure 2:
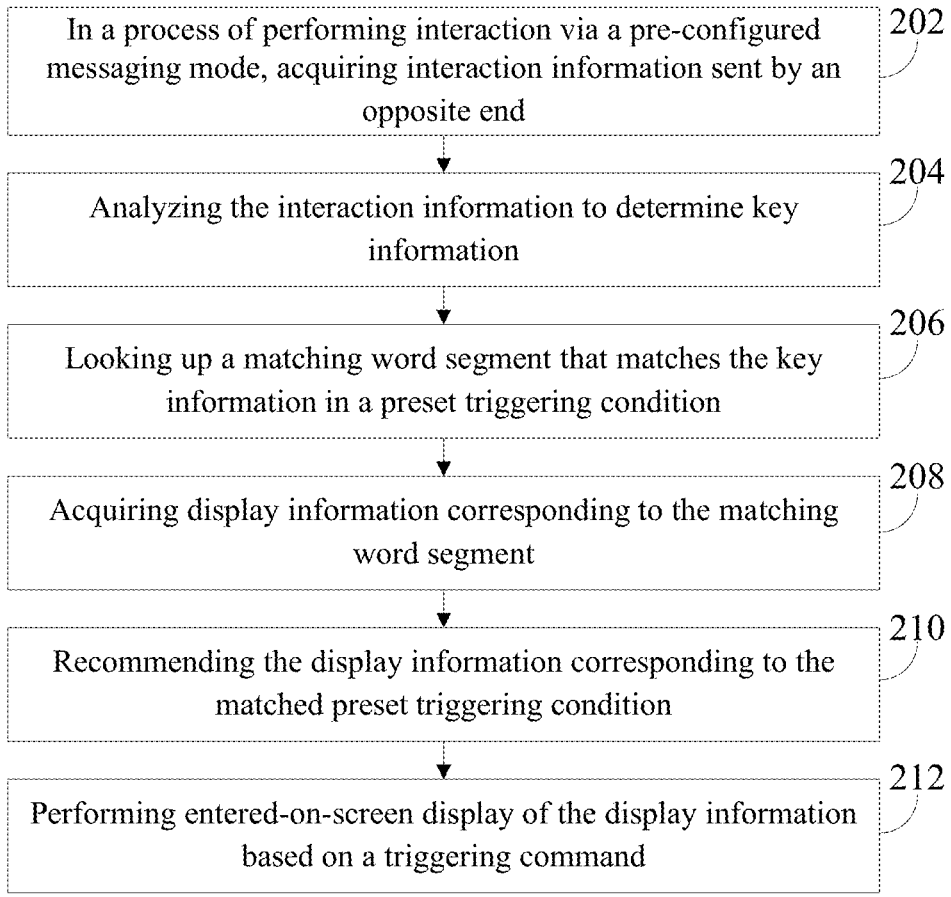
FIG. 2 illustrates a step flowchart of another information processing method based on opposite end information provided by embodiments of the present disclosure.

Referring to FIG. 2, a step flow chart of another information processing method based on opposite end information provided by embodiments of the present disclosure is illustrated, which may specifically comprise the following steps:

Step 202: in a process of performing interaction via a pre-configured messaging mode, acquiring interaction information sent by an opposite end.

Given a mobile terminal as an example, the user may use an instant messaging application for interaction, and interaction information in the interaction process may be displayed in the current messaging application. The current messaging application may be an instant messaging application or a short message application.

Step 204, analyzing the interaction information to determine key information.

Step 206, looking up a matching word segment that matches the key information in a preset triggering condition.

Step 208, acquiring display information corresponding to the matching word segment.

When analyzing the interaction information, a plurality of analysis approaches may be available, such as semantic analysis, and key-word extraction, etc. Optionally, various analysis approaches may be combined, for example, sentence-division and word property selection may be performed on the interaction information to determine the key word. Further, with reference to the semantic meaning of the interaction information, the key information of the interaction information is determined. Thus, the key information may be configured to identify content of the interaction information, and the key information may include a key word, and sentence meaning information, etc. Further, the matching word segment that matches the key information may be looked up in the preset triggering condition, and the display information corresponding to the matching word segment may be acquired.

In the present disclosure, the display information includes at least one of the following: key information, vertical search information, local relating information, emoji, and symbol information. The vertical search information refers to information that is returned to a user in a certain form after a single-time integration is performed on a certain type of specified information in a webpage library and the desired data obtained by directional extraction of divided word segments is extracted for processing. The vertical search is a newly proposed search engine service mode directed towards solving issues of a large information amount, inaccurate inquiry and insufficient depth of the common search engines. The vertical search provides certain valuable information and related service for a certain specific field, a certain group of people, or a certain specific demand. The local relating information refers to information acquired from the local end, such as terminal location information, address book information, agenda information, local application information, and local file information, etc. The emoji refers to an image related to an expression. The symbol information refers to information expressed using symbols, such as an emoticon, etc.

Optionally, the vertical search information includes at least one of the following: webpage-searching information, product-recommending information, multi-media information, application-recommending information, weather information, map information, and stock information. The webpage-searching information may be any type of webpage with webpage-searching content being news, encyclopedia, and website webpage, etc. Or, the webpage-searching information may be a URL (Uniform Resource Locator) address of a webpage, and webpage summary information, etc. The type of the webpage may be determined based on actual demand, such as a news hotpot webpage, and a forum webpage, etc. The product-recommending information refers to promotion information of a product, such as rating information of the product, store-recommending information, and coupon information, etc. The multi-media information refers to information related to multi-media, such as the summary information of an audio or video, etc. Further, the multi-media information may be from a local end or the internet, such that corresponding multi-media content may be played after being selected by a user. The application-recommending information refers to recommendation information of a terminal application, such as a hot APP (application). The weather information refers to information related to weather, such as weather-forecasting information, weather-forewarning information, air-quality information, living index information related to weather (e.g., dressing index information, travelling index information, etc.). The map information refers to information related to a geological location, such as the location of an address inputted by the user on the map, and the route information on the map, etc. The stock information refers to economical information (finance, stock, etc.), such as information of stock quotation, exchange rate, and interest rate.

The local relating information includes at least one of the following: terminal location information, address book information, agenda information, local application information, and local file information. The terminal location information refers to information related to the geological location of a terminal determined through locating, such as a locating location, and local map information determined through locating. The address book information refers to information in an address book of the terminal, such as various types of information including contact information (phone number, email address, address, etc.) of a contact. The agenda information refers to information of agenda recorded in a calendar or a backlog of the terminal. The local application information refers to application information already installed in the local end, such as QQ, Webchat, and various APPs. The local file information refers to files stored in the local end, such as content of the document and the multi-media resource including image, photo, audio, and video, etc. Obviously, the foregoing is only used as examples to illustrate the vertical search information and the local relating information, and shall not be construed as limiting of the present disclosure.

As such, by obtaining the key information of the interaction information through analysis, the matching word segment in the preset triggering condition may be obtained through matching, such that various types of display information may be determined for recommendation to the user. Thus, recommended display information may be obtained by automatic analysis and matching of the interaction information sent by the opposite end in the instant messaging process.

In an optional embodiment of the present disclosure, steps of acquiring display information corresponding to the matching word segment comprise: acquiring display information corresponding to the matching word segment locally, where the display information includes at least one of the local relating information, the emoji, and the emoticon; and/or, uploading the matching word segment to a server, and receiving the display information corresponding to the matching word segment that is fed back by the server, where the display information includes at least one of the vertical search information, the emoji, and the emoticon. In the present implementation, the display information may be from a local end, or may be from a network-side. For example, for the emoji, the emoticon, and/or the local relating information, etc., the display information may be determined for recommendation directly based on the content stored in the local end. Further, the matching word segment may be uploaded to the server-side, and the server-side may match the display information based on such matching word segment and further feed back the display information to the terminal for recommendation, thereby recommending the vertical search information, the emoji, and the emoticon, etc. Optionally, matching may be performed the local and network server-sides, respectively, thereby determining corresponding display information.

In another embodiment of the present disclosure, steps of acquiring the display information corresponding to the matching word segment may comprise: acquiring the locating information of the current terminal; and determining the matched display information based on the locating information and the matching word segment. The display information at least comprises: one of the weather information, map information, product-recommending information, terminal location information, and agenda information that are related to the locating information. In the present disclosure, some of the display information may be related to the location where the terminal is, such that when the display information corresponding to the matching word segment is information related to location, the current location information of the terminal may be determined by the user, or may be determined by invoking the locating device of the terminal. Or, the locating information may be determined based on non-entered-on-screen information, and the matched display information may be determined based on the locating information and the matching word segment.

The aforementioned display information determined based on the locating information may include at least one of the following: weather information related to the locating information, map information related to the locating information, product-recommending information related to the locating information, terminal location information related to the locating information, and agenda information related to the locating information, etc. For example, the weather information of a region, such as a city, corresponding to a location may be determined based on the locating information. Optionally, the location of an address on the map may be determined based on the locating information, and the map information of the correspondingly labeled location may be acquired. In one example, when the user A sends information of "你的位置是 (meaning 'where is your location')" to the user B, the interaction information of the opposite end (i.e., the user A) that is obtained by an application used by the user B is thus "你的位置是 (where is your location)". Through analysis, the key information is determined to be "位置 (location)" matching a matching word segment of "用户位置 (user location)". Accordingly, after acquiring the location information by invoking a locating device in the terminal of the user B and uploading the location information to the server, the application of the user B may receive feedback from the server to use a map image labeled with the location where the user B is as the display information for recommendation in the recommendation display region. Or, a map application in the local end of the user B may be invoke directly to obtain the map information corresponding to the user location as the display information for recommendation in the recommendation display region.

As such, the content of the disclosed display information may include but not limited to vertical search information of encyclopedia, rating, store or product recommendation, audio (e.g., music or voice clip), video (including animation, movie, etc.), geological location information, stock market, weather, and software recommendation. Further, the content of the disclosed display information may comprise related information that is read from a local machine, such as the geological location information, the address book lexicon, and the calendar. The display information may be full information of the above-described information, or may be information such as summary and pre-view, which may be determined based on practical demand, and the present disclosure is not limited thereto.

For example, when the user A sends information of "你想打篮球还是踢足球 (Do you want to play basketball or play soccer)", the interaction information of the opposite end (i.e., the user A) obtained by an application of the user B is "你想打篮球还是踢足球 (Do you want to play basketball or play soccer)". By analysis, the key information is determined to be "打篮球 (play basketball)" and "踢足球 (play soccer)", or "篮球 (basketball)" and "足球 (soccer)", thereby matching to a matching word segment of "消息内容选择 (information content selection)", which means to select from information. Accordingly, the key information may be used as the display information of the matching word segment. That is, "打篮球 (play basketball)" and "踢足球 (play soccer)" may be displayed in the recommendation display region of the application of the user B as candidates, or "篮球 (basketball)" and "足球 (soccer)" may be displayed as the candidates for recommendation.

Figure 3:
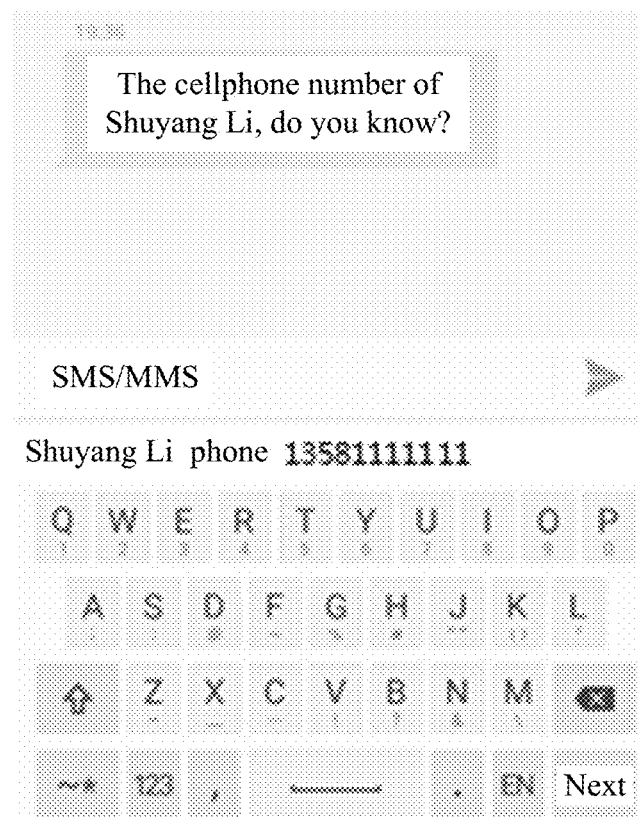
FIG. 3 illustrates a schematic view of a first-type display interface of a messaging application provided by embodiments of the present disclosure.

Further, given an input method as an example, a first-type display interface of a messaging application is shown in FIG. 3. The input method may acquire the interaction information sent by the user of the opposite-end in the interaction window or the chat window of the instant messaging application. For example, as shown in FIG. 3, the interaction information of "李舒扬的手机号码 你知道吗？(The cellphone number of Shuyang Li, do you know?)" sent by the opposite end may be acquired. Through analysis, the key information may be determined to be "李舒扬 (Shuyang Li)", "手机号码 (cellphone number)", etc., and a matching word segment that matches "手机号码 (cellphone number)" or "李舒扬 (Shuyang Li)" may need to be looked up in the preset triggering condition. The matching word segment may be "联系信息 (contact information)", and the input method may invoke the address book of the terminal based on "联系信息 (contact information)", thereby finding the cellphone number of "13581111111" of "李舒扬 (Shuyang Li)". Further, "李舒扬 (Shuyang Li)", "手机号码 (cellphone number)", and "13581111111" may be used to generate the corresponding display information. The display information may be displayed in a configuration region of the input method, such as the associative region or the candidate region, for example, the display information of "李舒扬手机号码 13581111111 (Shuyang Li cellphone number 13581111111)" may be recommended in the associative region.

Step 210, recommending the display information corresponding to the matched preset triggering condition.

After acquiring the display information corresponding to the matching word segment, the display information may be recommended for display, thereby providing the user the needed information for selection. In particular, the display information may be displayed in the candidate region of the input method, or the display information may be displayed in the associative region of the input method. Optionally, the display information may also be displayed in the recommendation display region of a corresponding application of an application platform. In the present disclosure, regarding the example of the input method, the region for the input method to display candidates may be divided based on actual situations. When input behavior exists but nothing is entered on screen, the display candidate region is called the candidate region, and when no input behavior exists, the region to display candidates is called the associative region. In the disclosed embodiment, the aforementioned candidate region and associative region may both be able to recommend display information, and the associative region may support actions such as click and redirect.

Step 212, performing entered-on-screen display of the display information based on a triggering command.

After the user read the display information recommended by the application, the display information that the user is interested in may be entered on screen. After receiving the triggering command of the user, the display information selected by the user may be determined from the parameters in the triggering command, and the selected display information may undergo an entered-on-screen process.

In the disclosed embodiment, performing entered-on-screen processing on the selected display information comprises: acquiring detailed information corresponding to the selected display information, and entering the detailed information on screen for display in the current messaging application, or, invoking a third-party application to display the detailed information corresponding to the selected display information. Based on the difference between the display information and the application environment, different entered-on-screen operations may be performed on the display information. In particular, the content that is entered-on-screen for display may be the display information. For example, if the display information is an emoji, the emoji may be directly entered on screen. Because the display information may also be summary content of certain information, the display information may correspond to the detailed information. For example, the webpage-searching information may be the summary content such as the title of the corresponding webpage and a link address, and the corresponding detailed information is the webpage. Or, the map information may be a thumbnail of the location or route, and the detailed information is then an actual location or route on the map.

In an optional embodiment of the present disclosure, directed towards the input method application, after performing analysis on the interaction information to determine the key information, the method further comprises: adding the key information to a high-frequency chat list; and the method further include: receiving an input character string, and based on the high-frequency chat list, determining a candidate comprising the key information that corresponds to the input character string. After the key information is determined through analysis of the interaction information, the key information may be further added to the high-frequency chat list, where the high-frequency chat list is a list of words showing a relatively high occurrence frequency for the user. Thus, in the subsequent character string input process of the user, when matching a candidate for the input character string, the candidate comprising the key information may be determined based on the high-frequency chat list.

For example, the user A may send "收到请回复 (please reply upon receival)" to the user B, and the input method of the user B may determine the key information to be "收到 (receival)" and "收到请回复 (please reply upon receival)" through analysis. The key information may be added to the high-frequency chat list of the input method used by the user B. If the user B inputs "shoudao", when matching the candidate via the input method kernel, instead of entering "受到 (meaning 'subject to', corresponding to 'shoudao' in Chinese Pinyin)" on screen by mistake, "收到 (meaning 'received', corresponding to 'shoudao' in Chinese Pinyin)" may show up as a top-ranked candidate based on the high-frequency chat list.

Or, for example, the user A may send "今天中午北语一吃还是北语二吃 (meaning 'where to eat this noon, beiyuyi or beiyuer', where 'beiyuyi' refers to the first dining hall of Beijing Language and Culture University, and 'beiyuer' refers to the second dining hall of Beijing Language and Culture University)" to the user B, and through analysis, the key information may be determined to be "北语一 (beiyuyi)" and "北语二 (beiyuer)". The two terms of "北语一 (beiyuyi)" and "北语二 (beiyuer)" are both self-created terms, and may be added to the high-frequency chat list of the input method used by the user B. Thus, when the user B inputs "beiyuyi", the top-ranked candidate may be determined to be "北语一 (beiyuyi)" based on the high-frequency chat list.

Based on the context information and current environmental information, the display information or the detailed information of the display information may be directly displayed in a current messaging application, or may be displayed by invoking a third-party application. For example, for the instant messaging application, if the display information is the webpage-searching information, the webpage information may be directly displayed in the application, or a corresponding webpage may be launched by invoking a browser application to display the webpage information. If the display information is the multi-media information, a third-party broadcast application may be invoked to broadcast the corresponding multi-media content. Or, for the map information, the map graph comprising a corresponding location may be displayed directly in a current application, or either a browser application or a map application may be invoked to display the map data corresponding to the location. Accordingly, in the present disclosure, the display mode of the display information may include but is not limited to forms of wap webpage redirection, APP terminal redirection, software download, and payment transition. For example, when the display information is the webpage-searching information, a browser application may be redirected to and started, and when the display information is payment information, a payment application may be redirected to.

With reference to specific application scenarios, embodiments regarding matching based on the interaction information of the opposite end are illustrated hereinafter. The preset triggering condition may be downloaded in advance from the server end (e.g., input method server, recommendation platform), and the preset triggering condition may include various matching word segments. Different matching word segments may match the same or different display information, depending on the actual demand.

Figure 4:
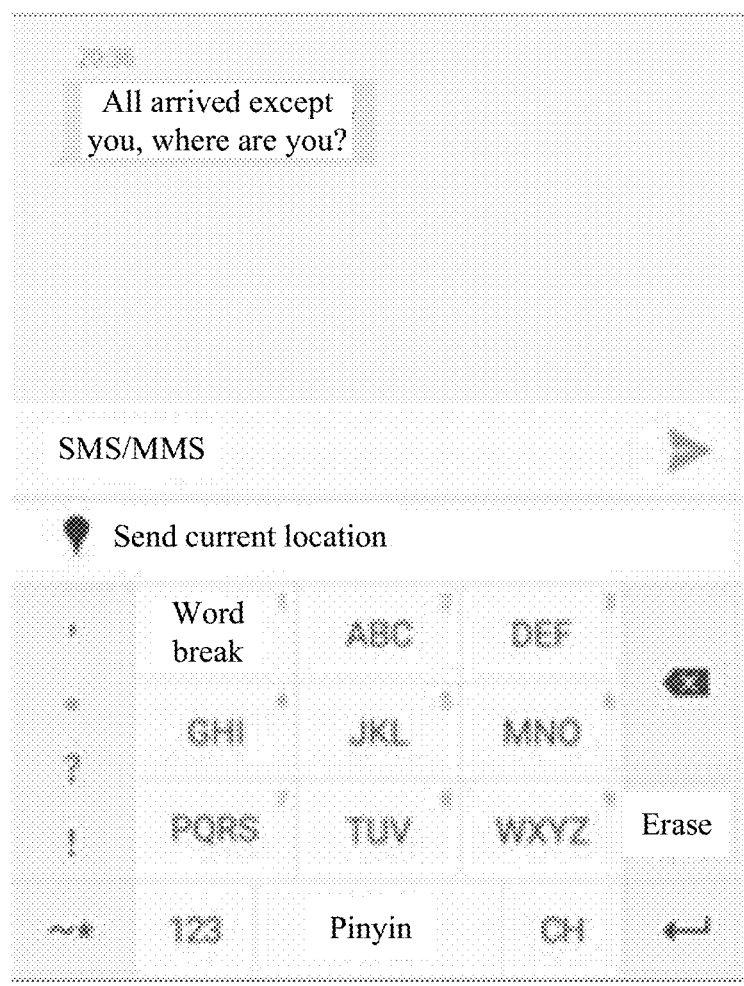
FIG. 4 illustrates a schematic view of a second-type display interface of a messaging application provided by embodiments of the present disclosure.

FIG. 4 illustrates a schematic view of a second-type display interface of a messaging application. When the opposite end sends the interaction information of "就差你了 到哪了? (all arrived except you, where are you?)", the input method may acquire the interaction information and determine the key information to be "到哪 (where)" or "位置 (location)" via analysis, such that the corresponding matching word segment is "定位信息 (locating information)". The input method matches the display information, and may perform recommendation and display in the associative region of the input method, such as recommending and displaying "发送当前位置 (sending out a current location)". Or, recommendation and display may be performed in the candidate region or the associative region, and the aforementioned display information may be specific location information. For example, the candidate of "搜狐网络大厦 (Souhu Internet Plaza, an office building in Beijing, China)" may be displayed. If the user selects the display information, the locating device may be invoked to acquire the current location of the terminal for display in the messaging application. For example, the location information described in words may be displayed, or the map information comprising such location may be displayed.

Figure 5:
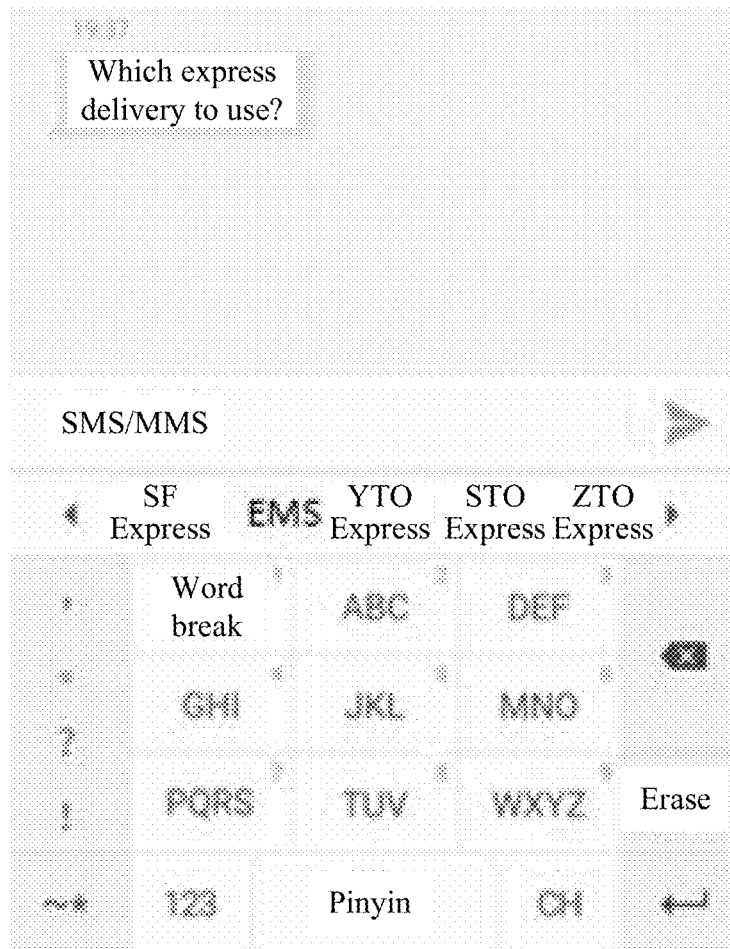
FIG. 5 illustrates a schematic view of a third-type display interface of a messaging application provided by embodiments of the present disclosure.

FIG. 5 illustrates a schematic view of a third-type display interface of a messaging application. When the opposite end sends the interaction information of "用什么快递 (which express delivery to use?)", the input method may acquire the interaction information and determine the key information to be "快递 (express delivery)" through analysis, and the corresponding matching word segment may be "产品推荐信息 (product-recommending information)". The input method may match the display information, and display "顺丰 EMS 圆 通 申通 中通 ('SF Express EMS YTO Express STO Express ZTO Express', where 'SF Express', 'EMS', 'YTO Express', 'STO Express', and 'ZTO Express' are individual delivery services companies)". If the user selects "顺丰 (SF Express)", the webpage-searching information corresponding to "顺丰 (SF Express)" may be displayed, such as the service telephone, company bio, and online-ordering webpage information.

In the process of messaging interaction, the interaction information sent by the opposite end may be acquired from the messaging application for analysis, and the display information corresponding to the matching word segment of the interaction information may be determined and recommended. Accordingly, the user may rapidly acquire various information related to interaction, thereby saving the time of various operations such as input, searching, and switching, etc.

Embodiment 3

Scenarios of the present disclosure are not limited to recommendation of the interaction information of the opposite end, and recommendation may be performed based on input content or a scenario of the local end.

Figure 6:
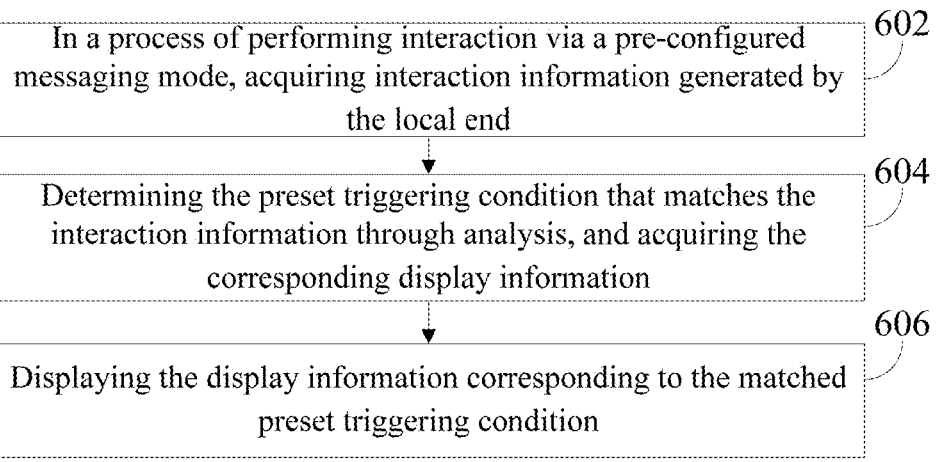
FIG. 6 illustrates a step flow chart of an information processing method based on local end information provided by embodiments of the present disclosure.

Referring to FIG. 6, a step flow chart of an information processing method based on local end information provided by embodiments of the present disclosure is illustrated, which may specifically include the following steps:

Step 602, in a process of performing interaction via a pre-configured messaging mode, acquiring interaction information generated by a local end.

The user may need to use an input method for input when performing interaction using the pre-configured messaging mode, thereby acquiring the interaction information generated corresponding to the input by the input method in the local end. The interaction information is the interaction information generated on one side of the application in the messaging process, comprising: entered-on-screen information and/or non-entered-on-screen information. The entered-on-screen information includes: information already sent to the interaction window or chat window of the current messaging application, and the information already entered on screen in a message-sending region of the messaging application, namely, the information selected by the input method that has been entered on screen but haven't been sent to the interaction window or the chat window. The pre-configured messaging mode includes at least one of the following: an instant messaging mode and a short message mode.

Step 604, determining a preset triggering condition that matches the interaction information through analysis, and acquiring the corresponding display information.

Step 606, displaying the display information corresponding to the matched preset triggering condition.

In the present disclosure, different interaction information may recommend the same or different display information. For example, when 'happy' is inputted, an expression related to happy may be recommended, or when 'weather' is inputted, the local weather information may be recommended. Thus, the present disclosure may pre-configure the triggering condition corresponding to the display information, and the preset triggering condition may be configured to trigger the matching and pushing of the display information, where the triggering condition may be distributed by the server or may be pre-configured or pre-stored in the local end. Further, the locally stored triggering condition may be edited, for example, the locally stored triggering condition may be added, deleted or altered, and embodiments of the present disclosure are not limited thereto.

By analyzing the interaction information, the preset triggering condition that matches the interaction information is determined, and the display information corresponding to the preset triggering condition is acquired. For example, the display information is recommended and displayed in the candidate region of the input method of the current terminal for selection by the user. Or, the display information may be recommended in the recommendation display region of the application. In the present disclosure, the non-entered-on-screen information in each input process may match and recommend one or more display information.

After input is fulfilled via the input method, when an operation is performed based on the input content, the operation can be relatively complicated. Thus, the present disclosure may acquire the interaction information generated by the local end, determine the preset triggering condition that matches the interaction information via analysis, and recommend the display information corresponding to the matched preset triggering condition. That is, the display information possibly need by the user may be recommended to the user for selection by the user. Accordingly, the display information related to input may be recommended in the input process, thereby simplifying the operation process and improving the efficiency.

Embodiment 4

Based on the aforementioned embodiments, the present disclosure further illustrates a method for performing information matching of the interaction information generated by the local end more fully hereinafter.

1. Matching and Recommendation of the Non-Entered-On-Screen Information.

Figure 7:
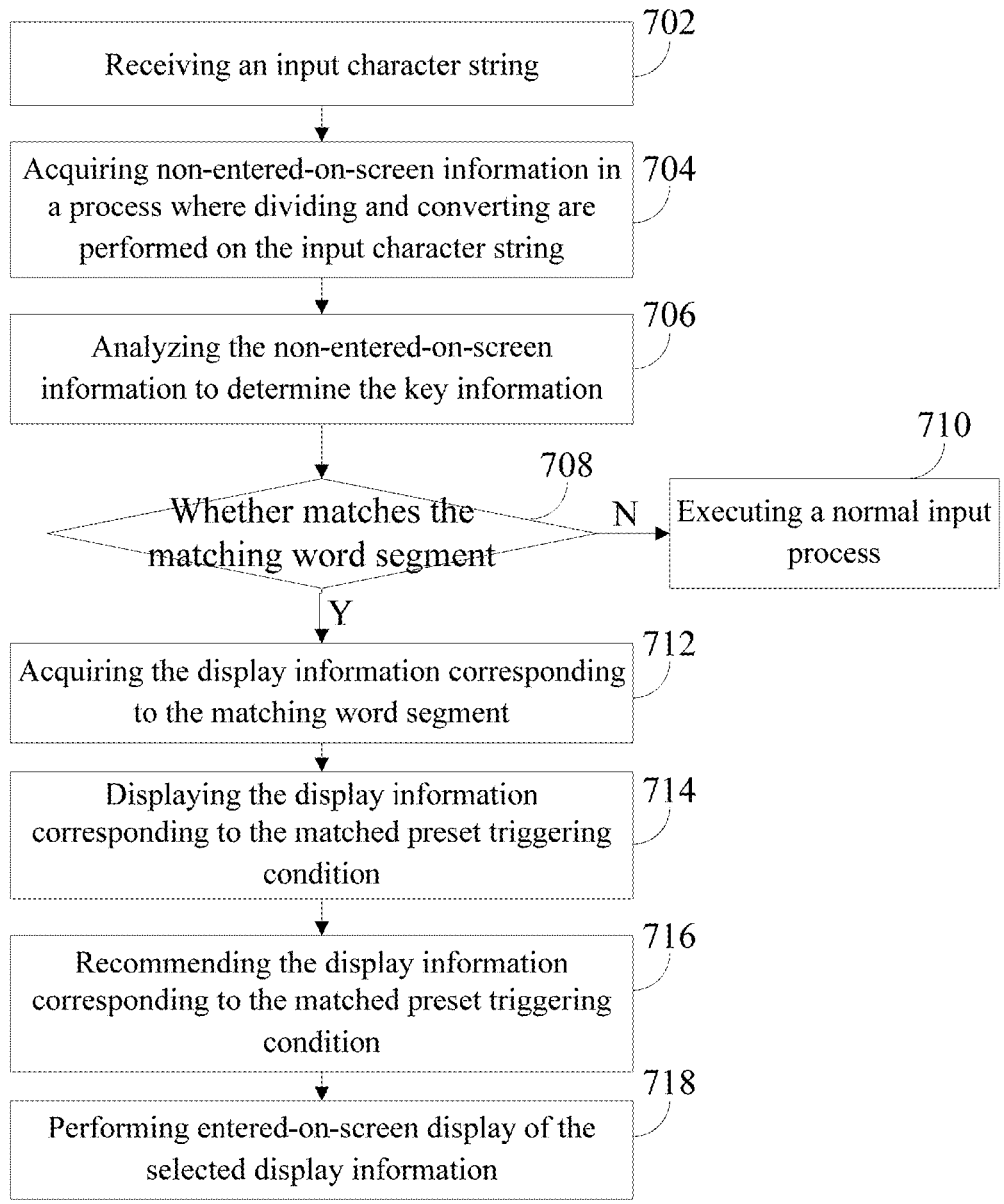
FIG. 7 illustrates a step flow chart of an information processing method based on non-entered-on-screen information of a local end provided by embodiments of the present disclosure.

Referring to FIG. 7, a step flow chart of an information processing method based on non-entered-on-screen information of a local end provided by embodiments of the present disclosure is illustrated, which may specifically comprise the following steps:

Step 702, receiving an input character string.

Step 704, acquiring non-entered-on-screen information in a process where division and conversion are performed on the input character string.

When the input method is applied for input, the input method system may acquire an input character string of the user, and perform processes such as division and conversion on the input character string via the input method kernel to determine a corresponding candidate for selection by the user. In the input process starting from receiving the user input character string and converting the input character string to a candidate entered on screen by the input method system, the non-entered-on-screen information of each stage may be acquired. In particular, the input character string is the user input content received directly by the input method system. The user may use any input approach to perform character input, such as input via a key board, a handwriting board, and a touch screen, etc. The input method kernel refers to the core algorithm of the input method system, and may display a candidate properly based on the input content.

Further, the aforementioned input process may use at least one of the following as non-entered-on-screen information: the input character string, a dividing result of the input character string, and a candidate obtained by corresponding conversion based on the dividing result of the input character string. That is, in the input process of the input method, the received input character string may be directly used as non-entered-on-screen information for matching, such as the input character string "weixiao", and "jintiantianqizenmey-ang", etc. Further, in the process where the input method divides the input character string, each obtained dividing result may be used as the non-entered-on-screen information. For example, the aforementioned input character string "jintiantianqizenmeyang" may be divided into "jin'tian/tian'qi/zen'me'yang". Further, "jin'tian", "tian'qi", and "zen'me'yang" may be treated as non-entered-on-screen information, respectively. Further, after the dividing result is converted, the candidate(s) obtained after conversion may be used as the non-entered-on-screen information. For example, the candidates "今天天气怎么样 (corresponding to 'jin'tian/tian'qi/zen'me'yang' in Chinese Pinyin, and meaning 'how is the weather today' in English)", "今天天气 (corresponding to 'jin'tian/tian'qi' in Chinese Pinyin, and meaning 'weather today' in English)", "今天 (corresponding to 'jin'tian' in Chinese Pinyin, and meaning 'today' in English)", and "天气 (corresponding to 'tian'qi' in Chinese Pinyin, and meaning 'weather' in English)" obtained by matching the aforementioned dividing results may be used as the non-entered-on-screen information.

Further, for the non-entered-on-screen information, embodiments of the present disclosure may determine the semantic meaning information or language environment information based on the context information, thereby determining the non-entered-on-screen information based on the semantic meaning or language environment.

Step 706, analyzing the non-entered-on-screen information to determine the key information.

Step 708, detecting whether the key information matches a matching word segment in the preset triggering condition.

Regarding the analysis approaches such as the semantic analysis of the interaction information and the extraction of key words, the key word may be determined by, for example, sentence division and word property selection. Further, with reference to the semantic meaning of the interaction information, the key information of the interaction information may be determined. Accordingly, the key information may be configured to identify the content of the interaction information. The key information may include a key word, and information of the meaning of a sentence, etc. Further, the matching word segment that matches the key information may be looked up in the preset triggering condition, thereby acquiring the display information corresponding to the matching word segment.

In the present disclosure, different preset triggering conditions may trigger to display different display contents, and for the same preset triggering condition, one or more matching word segments may be matched. For example, "开心 (happy)", "高兴 (pleased)", and "愉快 (joyful)" may be different matching word segments of the same preset triggering condition. Thus, different non-entered-on-screen information may match the same or different display information. In particular, the aforementioned triggering condition may be pre-configured in the local end, or may be distributed by the server and stored in the local end, or the aforementioned non-entered-on-screen information may be uploaded to the server for comparison, depending on the specific demands. The present disclosure is not limited thereto. Further, the locally stored triggering condition may be editable, for example, the locally stored triggering condition may be added, deleted, or altered, etc.

The matching word segment that matches the key information may be looked up in the preset triggering condition. For example, the key information may be used to match the matching word segment of the preset triggering condition, and whether the key information matches the matching word segment may be detected. If yes, namely, the key information matches the matching word segment, Step 712 is executed; if no, namely, the non-entered-on-screen information does not match the matching word segment, Step 710 is executed.

Step 710, executing a normal input process.

When the key information does not match the matching word segment, the input process of the input method may be executed normally. That is, the corresponding candidate may be displayed after division and conversion are completed.

Step 712, acquiring the display information corresponding to the matching word segment.

When matching the non-entered-on-screen information with the matching word segment in the preset triggering condition, the display information corresponding to the matching word segment is acquired. The display information comprises at least one of the following: vertical search information, local relating information, emoji, and symbol information. The vertical search information includes at least one of the following: webpage-searching information, product-recommending information, multi-media information, application-recommending information, weather information, map information, and stock information. The local relating information includes at least one of the following: terminal location information, address book information, agenda information, local application information, and local file information. The present disclosure may recommend various types of display information automatically based on the inputted non-entered-on-screen information, such that operations of searching and looking up, etc. may not wait to be executed until the input content is determined. Thus, the operation steps may be reduced, and the efficiency may be improved. In the present disclosure, each matching word segment may correspond to the display information, and after the non-entered-on-screen information is determined, the matching word segment corresponding to the non-entered-on-screen information may be determined, such that the matched display information may be determined.

In an optional embodiment of the present disclosure, steps of acquiring display information corresponding to the matching word segment comprise: acquiring display information corresponding to the matching word segment locally, where the display information includes at least one of the local relating information, the emoji, and the emoticon; and/or, uploading the matching word segment to a server, and receiving the display information corresponding to the matching word segment that is fed back by the server, where the display information includes at least one of the vertical search information, the emoji, and the emoticon.

In the present disclosure, the display information may be from a local end, or may be from a network-side. For example, the emoji, the emoticon information, and the local relating information, etc. may be directly determined as the display information for recommendation based on the content stored in the local end. Further, the matching word segment may be uploaded to the server-side, and the server-side may match the display information based on the matching word segment. Optionally, matching may be performed on the local terminal and the network server-side, respectively, thereby determining corresponding display information.

In another embodiment of the present disclosure, steps of acquiring the display information corresponding to the matching word segment may comprise: acquiring the locating information of the current terminal; determining matched display information based on the locating information and the matching word segment. The display information at least comprises: one of the weather information, the map information, the product-recommending information, the terminal location information, and the agenda information that are related to the locating information.

In the present disclosure, some of the display information is related to the location where the terminal is, such as the weather information and the map information. Thus, when the display information corresponding to the matching word segment is information related to location, the current location information of the terminal may be determined by the user, or may be determined by invoking the locating device of the terminal. Or, the locating information may be determined based on the non-entered-on-screen information, and the display information may be determined based on the locating information and the matching word segment. The aforementioned display information determined based on the locating information may at least include: one of the weather information related to the locating information, map information related to the locating information, product-recommending information related to the locating information, terminal location information related to the locating information, and agenda information related to the locating information, etc.

In one example, the region corresponding to a location may be determined based on the locating information, such as the weather information of a city. Or, the location of an address on the map may be determined based on the locating information, and the map information of a correspondingly labeled location may be acquired. For example, for a character string of "wodeweizhishi" inputted by the user, the corresponding candidate "我的位置是 (meaning "my location is" in English, and has a Chinese Pinyin expression of "wodeweizhishi")" may be used as the non-entered-on-screen information to match the matching word segment of "用户位置 (user location)". Thus, after invoking the locating device of the local end to acquire the location information and uploading the location information to the server, the input method may receive the feedback from the server and display the map information or map graph with labeled user location for display. Or, based on the semantic meaning of the context inputted by the user or the current environment information, the route information may currently need to be acquired by the user is analyzed and matched, such that the location determined by the non-entered-on-screen information may be acquired. Further, based on the locating information acquired by the terminal, the map of the local end may be invoked to acquire the route information of the location corresponding to the locating information acquired by terminal and the location corresponding to the non-entered-on-screen on the map.

Step 714, displaying the display information corresponding to the matched preset triggering condition.

After acquiring the display information corresponding to the matching word segment, the display information may be displayed, thereby providing information needed by the user for selection. The display information may be displayed in regions such as the candidate region or the associative region of the input method.

Step 716, recommending the display information corresponding to the matched preset triggering condition.

Step 718, performing entered-on-screen display of the selected display information.

After reading the display information recommended by the input method, the user may select the display information that he or she is interested in to be entered on screen. The input method receives a triggering command from the user, and determine the display information selected by the user from parameters from the triggering command. Further, the user performs an entered-on-screen process on the selected display information, and performs a process such as the entered-on-screen process on the candidate(s) corresponding to the matched non-entered-on-screen information of the display information.

In the disclosed embodiment, performing entered-on-screen processing on the selected display information comprises: acquiring the detailed information corresponding to the selected display information, and entering the detailed information on screen for display in the current messaging application; or, invoking a third-party application to display the detailed information corresponding to the selected display information.

Based on the difference between the display information and the application environment, different entered-on-screen operations may be performed on the display information. In particular, the content entered on screen for display may be the display information. For example, if the display information is an emoji, the emoji may be directly entered on screen. Because the display information may be summary content of certain information, the display information may correspond to the detailed information. For example, the webpage link information may be the summary content such as the title of the corresponding webpage and a link address, and the corresponding detailed information is thus the webpage. Or, the map information may be a thumbnail of the location or route, and the detailed information is then an actual location or route on the map.

Based on the context information and the current environmental information, the display information or the detailed information of the display information may be directly displayed in the current messaging application, or may be displayed by invoking the third-party application. For example, directed towards the instant messaging application, if the display information is the webpage-searching information, the webpage-searching information may be directly displayed in the application, or the corresponding webpage may be launched by invoking the browser application to display the webpage information. If the display information is the multi-media information, a third-party broadcast application may be invoked to broadcast the corresponding multi-media content. Or, for the map information, the map image comprising a corresponding location may be displayed directly in a current application, or the map data corresponding to the location may be displayed by invoking the browser application and the map application.

As such, in the input process of inputting a character string, the input character string, the dividing result of the input character string, and the candidate correspondingly obtained by conversion based on the dividing result of the input character string may all be used as non-entered-on-screen information for matching with the preset triggering condition via analysis. Accordingly, the matching may be more flexible and rapid, and the operations of acquiring corresponding display content that can be only executed after the input content is entered on screen may be reduced, thereby improving the display efficiency.

Further, the display information includes at least one of the following: vertical search information, local relating information, emoji, and symbol information. Accordingly, the input process may not need to be completed to view webpage content such as the news and coupon information. Without input, the multi-media information may be broadcasted, and the weather information and the map route may be looked up, thereby reducing execution steps such as inquiry after input.

The aforementioned embodiments illustrate the display of the display information triggered by the preset triggering condition in the input process, and enter the selected display information on screen. Accordingly, operations such as searching and looking up triggered after the input content is selected may be reduced, and the processing efficiency may be improved, thus facilitating the ease of use by the user.

In the disclosed embodiment, the above-described information processing method based on input is illustrated with reference to specific application scenarios. The preset triggering condition may be downloaded in advance from the input method server, and the preset triggering condition may include various matching word segments. Different matching word segments may match the same or different display information, and may be configured based on actual demands.

1. Use the Input Character String as Non-Entered-On-Screen Information for Matching The input character string "shengrikuaile" inputted by the user may be received as non-entered-on-screen information for matching, and a matching word segment of "生日快乐 (corresponding to 'shengrikuaile' in Chinese Pinyin, and meaning 'happy birthday' in English)" or "happy birthday" may be matched. The corresponding display information may be determined to be an emoji related to happy birthday, such as a dynamic or an animated image of a birthday cake, or an audio or audio summary of the happy birthday song. When the user selects the audio summary, the corresponding audio data may be acquired for broadcast.

2. Use a Dividing Result as Non-Entered-On-Screen Information for Matching

The character string of "jintianzhengkaixin" inputted by the user may be received, and the corresponding dividing result of "jintain/zheng/kaixin" may be obtained by dividing the input character string. Further, "kaixin" in the dividing result matches the matching word segment "愉快 (happy)", and the corresponding display information may be determined to be symbol information, such as the emoticon of "O(∩_∩)O~~". After being selected by the user, the emoticon may be entered on screen for display.

3. Use a Candidate as Non-Entered-On-Screen Information for Matching

The character string of "huoluhuoba" inputted by the user may be acquired and converted to obtain candidates of "火炉火吧, 火炉火, 活路, 火炉, 火 (corresponding to 'huoluhuoba, huoluhuo, huolu, huolu, huo' in Chinese Pinyin, and meaning 'Huo Lu Huo Ba, Huo Lu Huo, way out, furnace, fire' in English)", etc. The candidates may be used to match the matching word segments of the preset triggering condition, and the matching word segments of 火炉火 (Huo Lu Huo, a popular restaurant in China)" and "火 (fire)" may be obtained. Further, the corresponding display information may be coupon information summary of "火炉火 (Huo Lu Huo)" and an emoji of "火 (fire)". Optionally, the user may select the candidate "火炉火吧 (Huo Lu Huo Ba, meaning 'may be Huo Lu Huo?')" to be entered on screen, and send the candidate "火炉火吧 (Huo Lu Huo Ba)" to the interaction window or chat window of the current instant messaging application. The display information may be used as associative information of the candidate for display in the associative region, or may be displayed as a candidate in the candidate region after "火炉火吧 (Huo Lu Huo Ba)" is entered on screen.

Figure 8:
FIG. 8 illustrates a schematic view of a fourth-type display interface of a messaging application provided by embodiments of the present disclosure.

Further, after receiving the triggering command that selects the coupon information summary, "优惠信息简介 (meaning 'coupon information summary')" may be entered on screen for display in the interaction window or the chat window of the current instant messaging application based on the triggering command, as shown in FIG. 8. Further, when the user clicks the coupon information summary in the instant messaging application, various types of recommendation information such as the rating, location, recommended dishes, average cost, and coupons may be displayed.

Further, when determining the matching word segment corresponding to the non-entered-on-screen information, the matching word segment may be determined based on the context and the environment. For example, the input character string of "xidan" may be acquired, and the earlier information of "一会儿我要去 (in a moment, I want to go to)" may be also acquired, such that the specific location that the user wants to go to may be analyzed out through semantic analysis of the context. The corresponding candidate "西单 ('Xidan' in Chines Pinyin, an important commercial area in Beijing, China)" may be used as the non-entered-on-screen information to match a matching word segment of "线路 (route)", and the summary information recommended by the corresponding route may be displayed to the user. After the user selects the summary information recommended by the route, the acquired map that comprises a route between the user location and "西单 (Xidan)" or a real-time map that comprises the current road condition may be fed back to the user. The map may invoke an application program such as a map or a navigator installed in the terminal for display, or may receive feedback from the server for display.

Thus, in the input process, the input content of each stage may be used as the non-entered-on-screen information for matching, and the matching becomes more flexible. Further, the display information recommended by matching may be flexible and diverse, thereby providing various types of information to the user and better achieving an effect of simplifying the operation process.

2. Matching and Recommendation of the Entered-On-Screen Information

Figure 9:
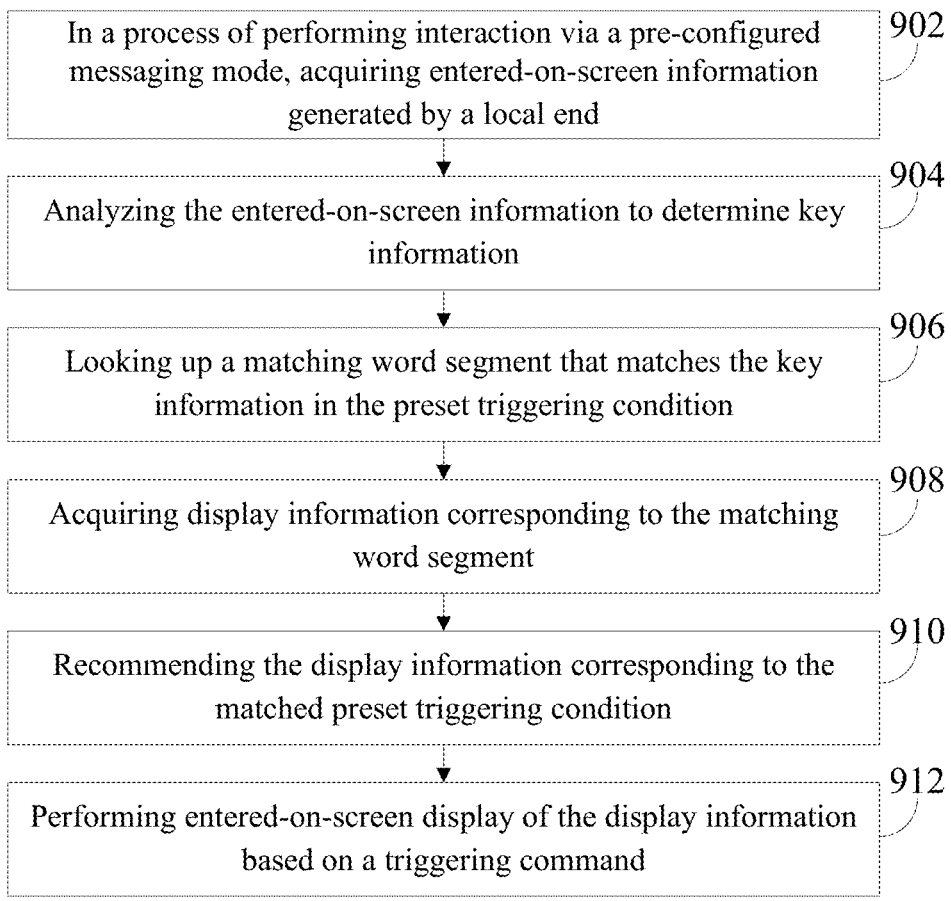
FIG. 9 illustrates a step flow chart of an information processing method based on entered-on-screen information of a local end provided by embodiments of the present disclosure.

Referring to FIG. 9, a step flow chart of an information processing method based on entered-on-screen information of a local end provided by embodiments of the present disclosure is illustrated. Given an example of using an application corresponding to the recommendation platform to acquire the entered-on-screen information of the local end, the following steps may be specifically included:

Step 902, in a process of performing interaction via a pre-configured messaging mode, acquiring entered-on-screen information generated by a local end.

Step 904, analyzing the entered-on-screen information to determine key information.

Step 906, looking up a matching word segment that matches the key information in the preset triggering condition.

Step 908, acquiring display information corresponding to the matching word segment.

Further, the following steps may be included:

Step 910, recommending the display information corresponding to the matched preset triggering condition.

Step 912, performing entered-on-screen display of the display information based on a triggering command.

The entered-on-screen information of the local end may include interaction information in the interaction information window or the chat window and the interaction information in the sending region that are inputted by an input method of the local end. The semantic analysis may be performed on the entered-on-screen information to acquire the key information, the matching word segment that matches the key information is looked up, the display information corresponding to the matching word segment is acquired, and the display information corresponding to the matched preset triggering condition is recommended. Further, the display information may be entered on screen for display based on a triggering command. The steps of performing entered-on-screen display of the display information based on the triggering command may include: based on the triggering command, entering the display information and the entered-on-screen information that has not been sent out on screen for display in the interaction window or the chat window of the current instant messaging application.

For example, the user A of the local end may enter "听听时间煮雨这首 歌 (please listen to the song called 'Time boils the rain')" on screen without sending it to the user B of the opposite end. That is, "听听时间煮雨这首 歌 (please listen to the song called 'Time boils the rain')" may be in the sending region without being sent to the interaction window or the chat window. After acquiring such interaction information, the key information may be determined to be "时间煮雨 (Time boils the rain)" and "歌 (song)" via analysis, and the matching word segment is "音乐 (music)". Thus, the correspondingly obtained display information is a broadcast link of "时间煮雨 (Time boils the rain)". If the user A of the local end selects to enter the broadcast link on screen the entered-on-screen information may be "听听时间煮雨这首 歌 (please listen to the song called 'Time boils the rain')" and the broadcast link. When the user selects to send the information, "听听时间煮雨这首 歌 (please listen to the song called 'Time boils the rain')" and the broadcast link may be together sent to the interaction window or the chat window of the user B of the opposite end. After one side of the opposite-end user B receives the content sent by the user A, the user B may click a corresponding link to listen to the song of "时 间煮雨 (Time boils the rain)".

Further, for example, the user A may send information of "你想打篮球还是踢 足 球 (do you want to play basketball or play soccer)" to the user B, and through analysis, the user may determine the key information to be "打篮球 (play basketball)" and "踢足球 (play soccer)", or "篮球 (basketball)" and "足球 (soccer)", matching to a matching word segment of "消息内容 选择 (information content selection)". The user A may select from the information and use the key information as the display information of the matching word segment. That is, "打篮球 (play basketball)" and "踢足球 (play soccer)" may be displayed in the recommendation display region of the application used by the user B. Or, "篮球 (basketball)" and "足球 (soccer)" may be displayed as candidates for recommendation in the example of the input method. Further, for example, after receiving the reply "你说呢 (you tell me)" from the user B, the user A may directly select and enter "打篮球 (play basketball)", "踢足球 (play soccer)", "篮球 (basketball)", or "足球 (soccer)" on screen.

Figure 10A:
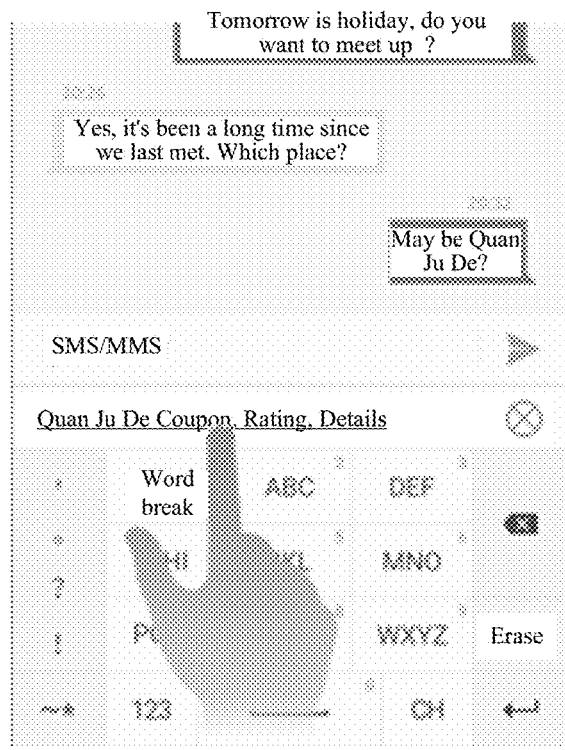
FIG. 10A and FIG. 10B illustrate schematic views of a fifth-type display interface of a messaging application provided by embodiments of the present disclosure.
Figure 10B:
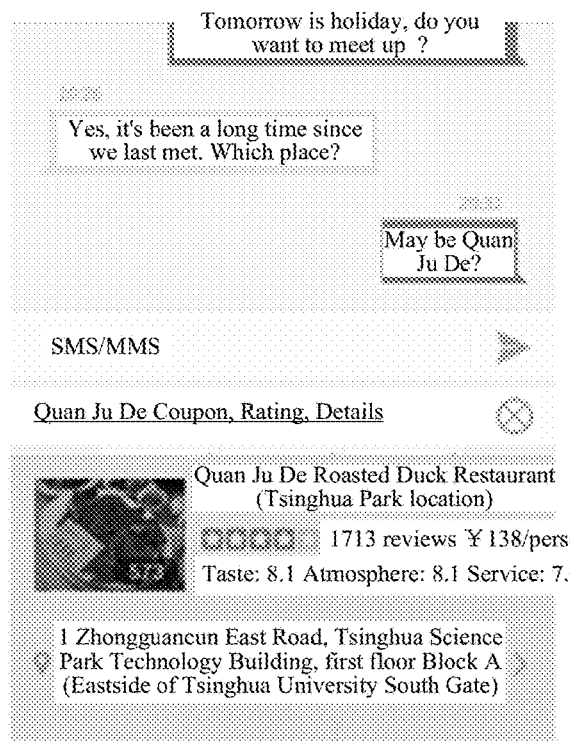

FIG. 10 illustrates a schematic view of a fifth-type display interface of a messaging application. In FIG. 10A, after the local end of the user A sends the entered-on-screen information of "全聚德吧 (Quan Ju De Ba, meaning 'may be Quan Ju De?')" to the interaction window or the chat window, the input method of the user A may acquire the interaction information and determine the key information to be "全聚德 (Quan Ju De, a famous Chinese restaurant)" via analysis, and the corresponding matching word segment may be "餐厅 (restaurant)". The input method of the user A may match the display information, and display "全聚德优惠 评分 详 情 (Quan Ju De coupon rating details)" in the associative region of the input method. If the user A selects the display information, the restaurant information related to Quan Ju De may be entered on screen for display, as shown in FIG. 10B. Further, when the input method of the user A determines the display information, the locating device may be invoked to acquire the current location information of the terminal for display, such that the restaurant named "全聚德 (Quan Ju De)" closest to the terminal may be matched and used as the top recommended display information.

Figure 11:
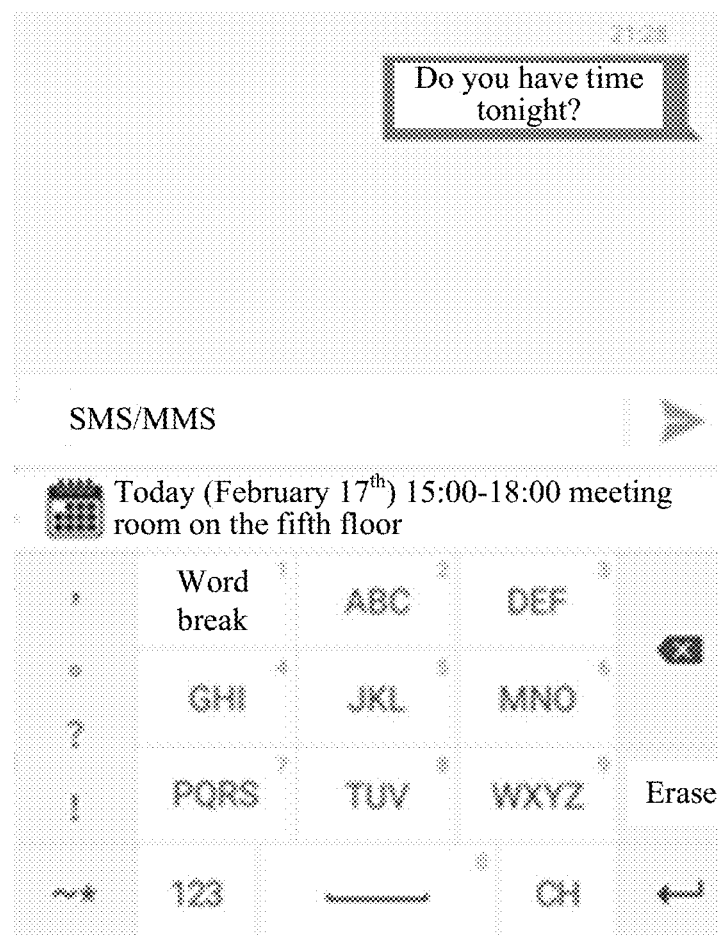
FIG. 11 illustrates a schematic view of a sixth-type display interface of a messaging application provided by embodiments of the present disclosure.

FIG. 11 illustrates a schematic view of a display interface of a sixth-type messaging application. The local end may send out the interaction information of "今天晚上有 空吗？(Do you have time tonight?)", and after acquiring the interaction information, the input method may determine the key information to be "今天 (today)" or "日程 (agenda)" via analysis, corresponding to the matching word segment of "日历 (calendar)" or "待办事项 (to-do list)". The input method may match the display information, and the associative region of the input method may display the to-do-list information or the notification information such as "今 天 (2 月 17 日) 15:00-18:00 五层会议室 (Today (February 17th) 15:00-18:00 meeting room on the fifth floor)" that corresponds to "日历 (calendar)".

The recommending & matching steps of the entered-on-screen information disclosed herein are basically consistent with the recommending & matching steps of the aforementioned non-entered-on-screen information, and thus are not repeated herein.

Accordingly, the present disclosure may match various types of display information through the interaction information of the local end, thereby recommending various types of information to the user, such as information of encyclopedia, news, audio/videos. Further, the commercial information may be recommended, such as sharing, rating, store products or brand recommendation.

In an optional embodiment of the present disclosure, directed towards the input method application, after analyzing the interaction information to determine the key information, the method further comprises: adding the key information to a high-frequency chat list; and the method further include: receiving an input character string, and based on the high-frequency chat list, determining a candidate comprising the key information that corresponds to the input character string.

After analyzing the interaction information to determine the key information, the key information may be added to the high-frequency chat list, where the high-frequency chat list is a list of words with a relatively high occurrence frequency for the user. Thus, in the subsequent character string input process conducted by the user, when matching the candidate for the input character string, the candidate comprising the key information may be determined based on the high-frequency chat list.

For example, the user A may send "今天中午北语一吃还是北语二吃 (meaning 'where to eat this noon, beiyuyi or beiyuer', where 'beiyuyi' and 'beiyuer' respectively refer to the first and second dining halls of Beijing Language and Culture University)" to the user B, and via analysis, the key information may be determined to be "北语一 (beiyuyi)" and "北语二 (beiyuer)", where both terms of "北语一 (beiyuyi)" and "北语二 (beiyuer)" are self-created terms. The terms of "北语一 (beiyuyi)" and "北语二 (beiyuer)" may be added to the high-frequency chat list of the input method used by the user A. Further, the user A may receive the reply "听你的 (Up to you)" from the user B, and when the user A continue to input "beiyuyi", the top-ranked candidate may be determined to be "北语一 (beiyuyi)" based on the high-frequency chat list.

It should be noted that, regarding the method embodiments of the present disclosure, for ease of descriptions, the method embodiments may be expressed as a series of action combinations. But those skilled in the relevant art shall understand that, the present disclosure is not limited to the order of actions described herein, because according to embodiments of the present disclosure, certain steps may be executed using other orders or may be performed approximately the same time. Further, those skilled in the relevant art shall understand that the embodiments described in the specification all belong to preferred embodiments, and the related actions may not be essential to embodiments of the present disclosure.

Embodiment 5

Based on the aforementioned embodiments, the present disclosure further provides an information processing device.

Figure 12:
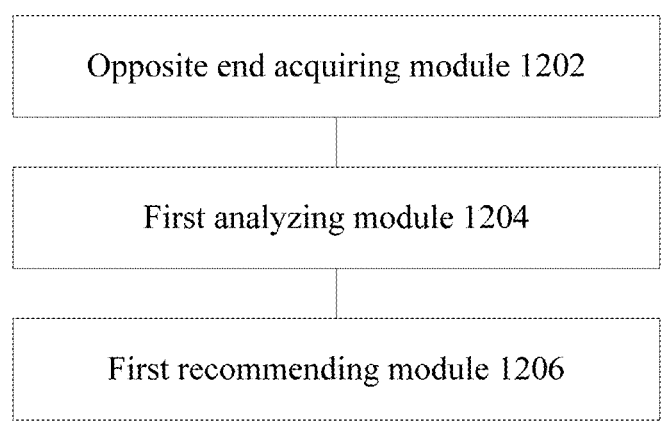
FIG. 12 illustrates a structural diagram of an information processing device provided by embodiments of the present disclosure.

Referring to FIG. 12, a structural diagram of an information processing device provided by Embodiment 5 of the present disclosure is illustrated. The information processing device provided by Embodiment 5 of the present disclosure may specifically include the following modules.

An opposite end acquiring module 1202 is configured to, in a process of performing interaction via a pre-configured messaging mode, acquire interaction information sent by an opposite end. A first analyzing module 1204 is configured to determine a preset triggering condition that matches the interaction information through analysis, and acquire corresponding display information. A first recommending module 1206 is configured to recommend the display information corresponding to the matched preset triggering condition.

In embodiments of the present disclosure, the pre-configured messaging mode includes at least one of the following: an instant messaging mode and a short message mode. Obviously, other communication modes for interaction may be included, and the present disclosure is not limited thereto.

As such, in a process of performing interaction via a pre-configured messaging mode, the interaction information sent by an opposite end may be acquired. A preset triggering condition that matches the interaction information is determined through analysis, the display information corresponding to the matched preset triggering condition is determined, and the display information possibly need by the users may be directly recommended for selection by the users. The information in which the users may be possibly interested during the interaction process may be recommended directly and be displayed. Thus, the operation process is simplified, and the efficiency is improved.

Figure 13:
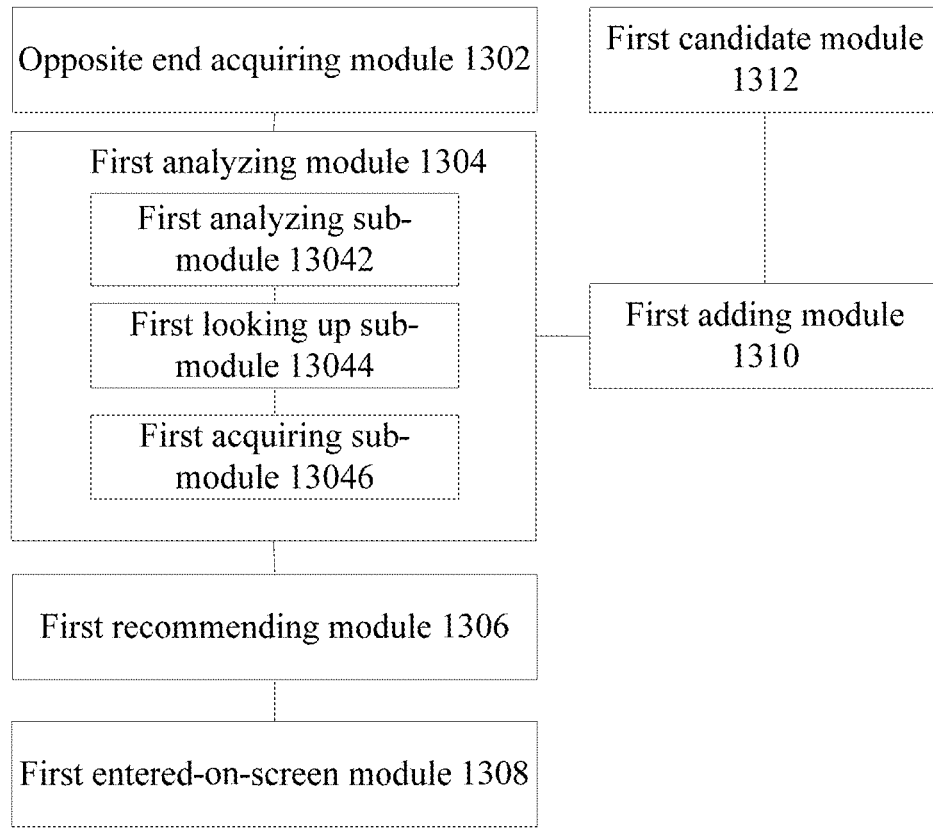
FIG. 13 illustrates another structural diagram of an information processing device provided by Embodiment 5 of the present disclosure.

Referring to FIG. 13, a structural diagram of another information processing device provided by Embodiment 5 of the present disclosure is illustrated. The information processing device provided by embodiment 5 of the present disclosure may include the following modules.

An opposite end acquiring module 1302 is configured to, in a process of performing interaction via a pre-configured messaging mode, acquire interaction information sent by an opposite end. A first analyzing module 1304 is configured to determine a preset triggering condition that matches the interaction information through analysis, and acquire corresponding display information. A first recommending module 1306 is configured to recommend the display information corresponding to the preset triggering condition. A first entered-on-screen module 1308 is configured to perform entered-on-screen display of the display information based on a triggering command.

More specifically, the first analyzing module 1304 comprises: a first analyzing sub-module 13042 configured to analyze the interaction information to determine key information; a first looking up sub-module 13044 configured to look up a matching word segment that matches the key information in the preset triggering condition; a first acquiring sub-module 13046 configured to acquire the display information corresponding to the matching word segment. The display information includes at least one of the following: key information, vertical search information, local relating information, emoji, and symbol information.

In an optional embodiment of the present disclosure, the first acquiring sub-module 13046 is configured to acquire the display information corresponding to the matching word segment locally, where the display information includes at least one of the local relating information, the emoji, and the emoticon; and/or, upload the matching word segment to a server, and receive the display information corresponding to the matching word segment that is fed back by the server, where the display information includes at least one of the vertical search information, the emoji, and the emoticon.

The vertical search information includes at least one of the following: webpage-searching information, product-recommending information, multi-media information, application-recommending information, weather information, map information, and stock information. The local relating information includes at least one of the following: terminal location information, address book information, agenda information, local application information, and local file information.

In an optional embodiment of the present disclosure, the first acquiring sub-module 13046 is configured to acquire the locating information of the current terminal; and determine the matched display information based on the locating information and the matching word segment. The display information includes at least one of the following: the weather information, the map information, the product-recommending information, the terminal location information, and the agenda information that are related to the locating information.

In an optional embodiment, the first recommending module 1306 is configured to recommend the display information corresponding to the matched preset triggering condition in the associative region or the candidate region of the input method.

In an optional embodiment of the present disclosure, the first entered-on-screen module 1308 is configured to select the display information based on a triggering demand; acquire the detailed information corresponding to the selected display information, and enter the detailed information on screen for display in the current messaging application corresponding to the pre-configured messaging mode; or, invoking a third-party application to display the detailed information. The pre-configured messaging mode comprises at least one of the following: an instant messaging mode and a short message mode.

In another optional embodiment of the present disclosure, the device further comprises: a first adding module 1310 configured to add the key information to a high-frequency chat list; a first candidate module 1312 configured to receive an input character string, and determine a candidate comprising the key information that corresponds to the input character string.

Thus, in the process of messaging interaction, the interaction information sent by the opposite end may be acquired from the messaging application for analysis, and the display information corresponding to the matching word segment of the interaction information may be determined and recommended. Accordingly, the user may rapidly acquire various types of information related to interaction, thereby saving the time of various operations such as input, look-up, and switching, etc.

Embodiment 6

Based on embodiments of the present disclosure, the present disclosure further discloses an information processing device.

Figure 14:
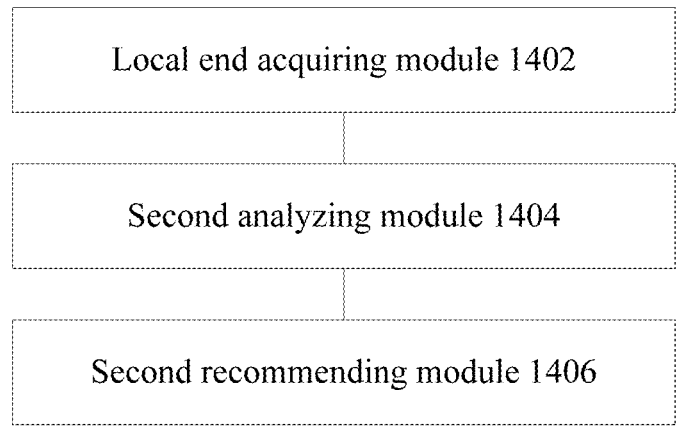
FIG. 14 illustrates a structural diagram of an information processing device provided by Embodiment 6 of the present disclosure.

Referring to FIG. 14, a structural diagram of an information processing device provided by Embodiment 6 of the present disclosure is illustrated. Embodiment 6 of the present disclosure provides an information processing device, specifically including the following modules.

A local end acquiring module 1402 is configured to, in a process of performing interaction via a pre-configured messaging mode, acquire interaction information generated by the local end. A second analyzing module 1404 is configured to determine a preset triggering condition that matches the interaction information via analysis, thereby obtaining the corresponding display information. A second recommending module 1406 is configured to recommend the display information corresponding to the matched preset triggering condition.

In embodiments of the present disclosure, the pre-configured messaging mode includes at least one of the following: an instant messaging mode and a short message mode. Obviously, other communication modes for interaction may be included, and the present disclosure is not limited thereto.

The present disclosure acquires the interaction information generated by the local end. The preset triggering condition that matches the interaction information is determined through analysis, the display information corresponding to the matched preset triggering condition is determined, and the display information possibly need by the users may be directly recommended for selection by the users. The display information related to input may thus be recommended in the input process. Accordingly, the operation process is simplified, and the efficiency is improved.

Figure 15:
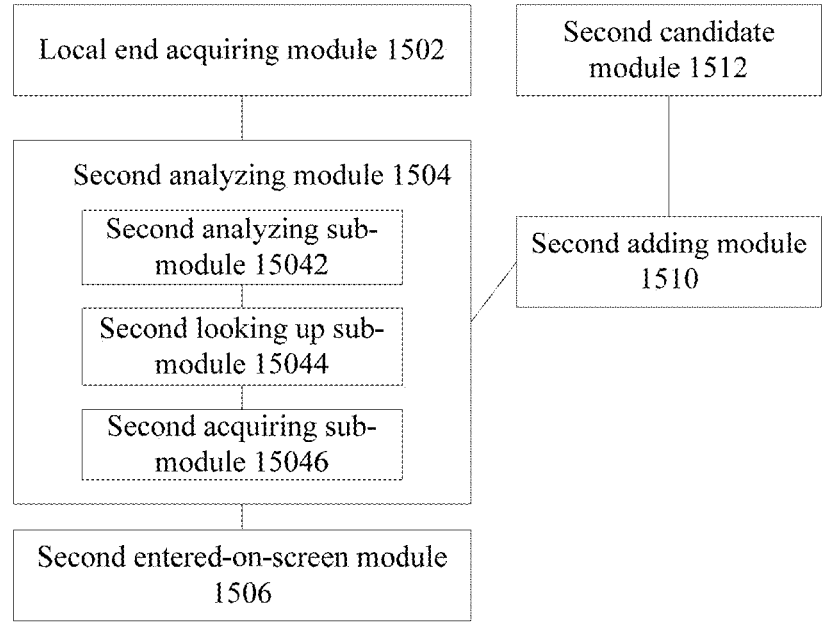
FIG. 15 illustrates another structural diagram of an information processing device provided by Embodiment 6 of the present disclosure.

Referring to FIG. 15, a structural diagram of another information processing device provided by Embodiment 6 of the present disclosure is illustrated. The information processing device provided by Embodiment 6 of the present disclosure may specifically include the following modules.

A local end acquiring module 1502 is configured to, in a process of performing interaction via a pre-configured messaging mode, acquire interaction information generated by the local end. A second analyzing module 1504 is configured to determine a preset triggering condition that matches the interaction information via analysis, thereby obtaining the corresponding display information. A second recommending module 1506 is configured to recommend the display information corresponding to the matched preset triggering condition. A second entered-on-screen module 1508 is configured to perform entered-on-screen display of the display information based on a triggering command.

The interaction information generated by the local end may include: the entered-on-screen information and/or the non-entered-on-screen information.

In an optional embodiment, the local end acquiring module 1502 is configured to, when the interaction information is the non-entered-on-screen information, receive an input character string; in a process of dividing and converting the input character string, acquire at least one of the following as the non-entered-on-screen information: the input character string, a dividing result of the input character string, and a candidate obtained by corresponding conversion based on the dividing result of the input character string.

The second analyzing recommendation module 1504 comprises: a second analyzing sub-module 15042 configured to analyze the interaction information to determine the key information; a second looking up sub-module 15044 configured to look up the matching word segment that matches the key information in the preset triggering condition; a second acquiring sub-module 15046 configured to acquire the display information corresponding to the matching word segment. The display information includes at least one of the following: key information, vertical search information, local relating information, emoji, and symbol information.

In an optional embodiment of the present disclosure, the second acquiring sub-module 15046 is configured to acquire the display information corresponding to the matching word segment locally, where the display information includes: at least one of the local relating information, the emoji, and the emoticon; and/or, upload the matching word segment to a server, and receive the display information corresponding to the matching word segment that is fed back by the server, where the display information includes: at least one of the vertical search information, the emoji, and the emoticon.

The vertical search information includes at least one of the following: webpage-searching information, product-recommending information, multi-media information, application-recommending information, weather information, map information, and stock information. The local relating information includes at least one of the following: terminal location information, address book information, agenda information, local application information, and local file information.

In an optional embodiment of the present disclosure, the second acquiring sub-module 15046 is configured to acquire the locating information of the current terminal; and determine the matched display information based on the locating information and the matching word segment. The display information includes at least one of the following: the weather information, the map information, the product-recommending information, the terminal location information, and the agenda information that are related to the locating information.

In an optional embodiment, the second recommending module 1506 is configured to recommend the display information corresponding to the matched preset triggering condition in the associative region or the candidate region of the input method.

In an optional embodiment of the present disclosure, the second entered-on-screen module 1508 is configured to select the display information based on the triggering command, acquire the detailed information corresponding to the selected display information, and enter the detailed information on screen for display in the messaging application corresponding to the pre-configured messaging mode; or, invoking a third-party application to display the detailed information corresponding to the selected display information. The pre-configured messaging mode comprises at least one of the following: an instant messaging mode and a short message mode.

In an optional embodiment of the present disclosure, the second entered-on-screen module 1508 is further configured to enter the display information and the entered-on-screen that has not been sent out on screen for display in the current messaging application based on the triggering command. For example, the display information and the entered-on-screen that has not been sent out may be displayed in the interaction window or the chat window of the current messaging application.

In an optional embodiment of the present disclosure, the device further comprises: a second adding module 1510 configured to add the key information to a high-frequency chat list; a second candidate module 1512 configured to receive an input character string, and based on the high-frequency chat list, determine a candidate comprising the key information that corresponds to the input character string.

As such, in the input process of the input character string, the input character string, the dividing result of the input character string, and the candidate correspondingly obtained by conversion based on the dividing result of the input character string may all be used as non-entered-on-screen information and matched with the preset triggering condition via analysis. Accordingly, the matching method may be more flexible and rapid, and the operations of acquiring corresponding display content that can be only executed after the input content is entered on screen may be reduced, thereby improving the display efficiency.

Further, the display information includes at least one of the following: vertical search information, local relating information, and emoji and symbol information. Accordingly, input may not be needed to be fulfilled to view webpage content such as news and coupon information. Without input, the multi-media information may be broadcasted, and the weather information and the map route may be looked up, thereby reducing execution steps such as inquiry after input.

Because the device embodiments are basically similar to the method embodiments, the descriptions of the device embodiments are relatively simple, and the related portions may refer to the illustrations of the method embodiments.

Those skilled in the art should understand that the embodiments of the present disclosure may provide methods, devices, or computer program products. Accordingly, embodiments of the present disclosure may adopt entire hardware embodiments, entire software embodiments, or a form combining software embodiments and hardware embodiments. Further, embodiments of the present disclosure may adopt a form of computer program products implemented in one or more computer-readable storage media (including but not limited to magnetic disc storage, CD-ROM, optical storage, etc.) including computer-readable program codes.

Figure 16:
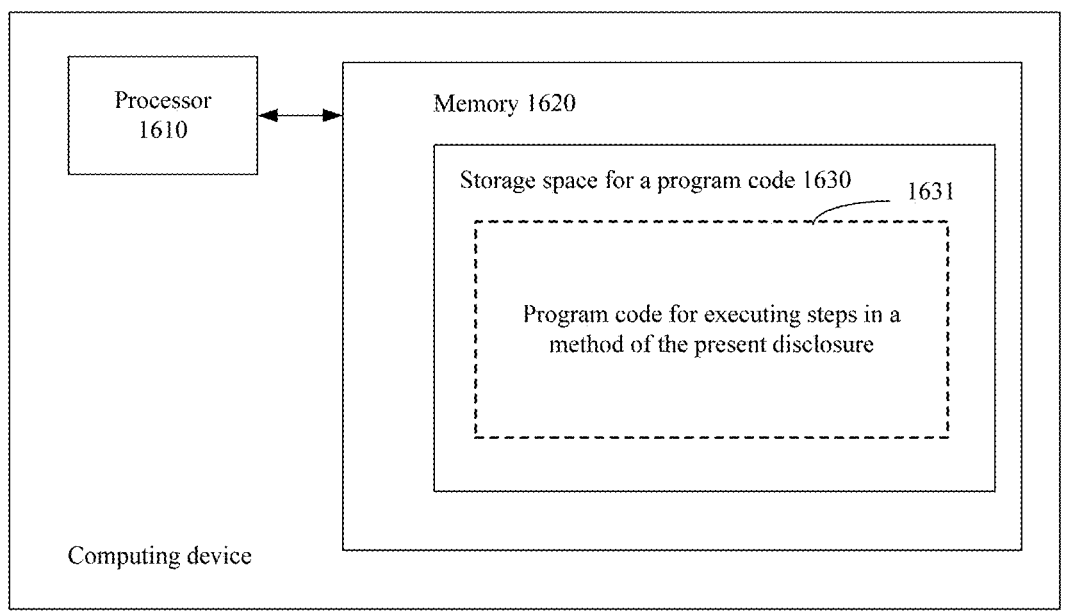
FIG. 16 illustrates a structural diagram of a computing device for executing an information processing method according to the present disclosure.
Figure 17:
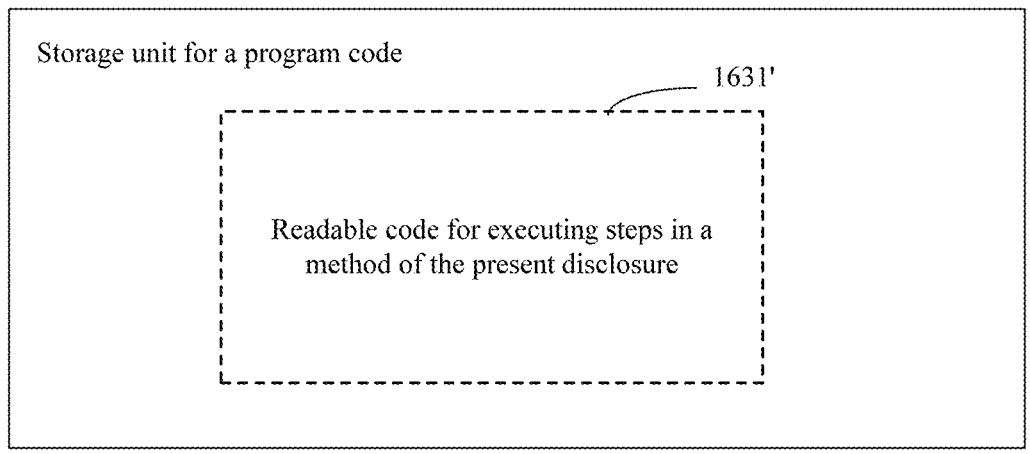
FIG. 17 illustrates a storage unit configured to maintain or carry a program code for implementing an information processing method according to the present disclosure.

For example, FIG. 16 illustrates a computing device for implementing information processing according to the present disclosure. The computing device traditionally comprises a processor 1610 and a program product or readable medium in the form of a memory 1620. The memory 1620 may be an electronic memory such as a flash drive, an EEPROM (electrically erasable programmable read-only memory), EPROM (erasable programmable read-only memory) or ROM (read-only memory). The memory 1620 includes a storage space 1630 configured to execute a program code 831 of any method step in the aforementioned methods. For example, the storage space 1630 configured for the program code may include various program codes 1631 for respectively implementing each step of the aforementioned methods. Such program codes may be read out from one or more program products or may be written into one or more program products. Such program products may include a program code carrier such as a memory card. This type of program products are often portable or fixed storage unit illustrated in FIG. 17. The storage unit may include storage section and storage space similarly arranged in the memory 1620 of the computing device shown in FIG. 16. The program codes may be, for example, compressed in an appropriate form. Often, the storage unit may include a readable code 831', such as the code readable by a processor similar to the processor 1610. When such codes are run by the computing device, the computing device may execute each step of the method described in the above embodiments.

Aspects of the present disclosure are described with reference to flowcharts and/or block diagrams of the methods and devices. It should be understood that computer program instructions may implement each process and/or block in the flowcharts and/or block diagrams, and combinations of process and/or block in the flowcharts and/or the block diagrams. These computer program instructions may be provided to a processor of a general purpose computer, special purpose computer, embedded processor, or other processors of programmable data processing terminal device to produce a machine, such that the instructions, which are executed via the processor of the computer or other programmable data processing terminal unit, creates devices for implementing functions specified in one process or a plurality of processes in the flowcharts and/or one block or a plurality of blocks in the block diagrams.

These computer program instructions may also be stored in computer-readable medium that can direct a computer or other programmable data processing terminal devices in a particular manner, such that the instructions stored in the computer-readable medium produce an article of manufacture including an instructional device. The instructional device implements functions specified in one process or a plurality of processes in the flowcharts and/or one block or a plurality of blocks in the block diagrams.

The computer program instructions may also be loaded onto a computer, or other programmable data processing terminal units, such that the computer or other programmable terminal units execute a series of operational steps to produce a computer implemented process, such that the instructions executed in the computer or other programmable terminal units provide processes for implementing the functions specified in one process or a plurality of processes in the flowcharts and/or one block or a plurality of blocks in the block diagrams.

In this document, relational terms such as first and second, and the like may be used solely to distinguish one entity or operation from another entity or operation without necessarily requiring or implying any actual such relationship or order between such entities or operations. Further, terms "including", "comprising", or any other variation thereof are intended to cover a non-exclusive inclusion, such that a process, method, article or terminal device that comprises a list of elements does not include only those elements but may include other elements not expressly listed or inherent to such process, method, article, or terminal device. An element proceeded by "comprises . . . a" does not, without more constraints, preclude the existence of additional identical elements in the process, method, article, or terminal device that comprises the element.

Foregoing is detailed description of an information processing method and an information processing device provided by the present disclosure. Specific embodiments are applied in the document to illustrate principles and implementation methods of the present disclosure. Illustrations of the above-described embodiments are only used to help understand the method and core idea of the present disclosure. Meanwhile, those ordinarily skilled in the art may, according to the spirit of the present disclosure, make changes to specific embodiments and application scope. As such, the content of the specification should not be understood to be limiting of the present disclosure.

What is claimed is:

1. An information processing method, comprising:
    receiving, by a first terminal, interaction information sent from a second terminal via instant messaging or short messaging;
    upon receipt of the interaction information at the first terminal and without entry of any input from a user of the first terminal, determining a matching word segment based on the interaction information;
    obtaining display information corresponding to the matching word segment, wherein the display information includes two or more candidate answers to a question, and the two or more candidate answers are selectable at the first terminal, and wherein the display information includes at least one of key information, local relating information, an emoji, and symbol information, wherein obtaining display information further comprises one or more of:
        in response to determining the matching word segment, invoking an address book of the first terminal to obtain a contact's name or phone number, and including the contact's name or phone number in the display information; or
        in response to determining the matching word segment, obtaining a geographical location of the first terminal, and including the geographical location of the first terminal in the display information; or
        in response to determining the matching word segment, obtaining a calendar event of the user of the first terminal, and including the calendar event of the user of the first terminal in the display information;
    displaying the display information;
    receiving a first input from the user of the first terminal, the first input including a selection of the two or more candidate answers;
    displaying by the first terminal a second input entered by the user of the first terminal;
    prior to sending the first input to the second terminal, generating by the first terminal a broadcast link based on the second input; and
    sending to the second terminal both the first input including the selection of the two or more candidate answers and the broadcast link generated based on the second input.

2. The method according to claim 1, wherein the two or more candidate answers are correspondingly determined based on the interaction information.

3. The method according to claim 1, wherein:
    the display information further includes vertical search information, and
    the vertical search information includes at least one of webpage-searching information, product-recommending information, multi-media information, application-recommending information, weather information, map information, and stock information.

4. The method according to claim 1, wherein obtaining display information corresponding to the matching word segment includes at least one of:

obtaining the display information corresponding to the matching word segment locally from the first terminal; and uploading the matching word segment to a server, and receiving from the server the display information corresponding to the matching word segment.

5. The method according to claim 1, wherein displaying the display information includes at least one of:

recommending the display information according to a preset triggering condition that matches the interaction information in an associative region or a candidate region of an input method; and displaying the displaying information in a recommendation display region of a corresponding application.

6. The method according to claim 1, further comprising:

performing entered-on-screen display of the display information according to a triggering command: or obtaining the display information according to the triggering command, and displaying the display information in an application of instant messaging or short messaging; or executing one of: displaying the display information in the application of instant messaging or short messaging, and invoking a third-party application to display the display information.

7. An information processing method, comprising:

receiving, by a first terminal, interaction information sent from a second terminal via instant messaging or short messaging;

upon receipt of the interaction information at the first terminal and without entry of any input from a user of the first terminal, determining a matching word segment based on the interaction information;

obtaining display information corresponding to the matching word segment, wherein the display information includes two or more candidate answers to a question, and the two or more candidate answers are selectable at the first terminal, and wherein the display information includes at least one of key information, local relating information, an emoji, and symbol information, wherein obtaining display information further comprises one or more of:

in response to determining the matching word segment, invoking an address book of the first terminal to obtain a contact's name or phone number, and including the contact's name or phone number in the display information; or in response to determining the matching word segment, obtaining a geographical location of the first terminal, and including the geographical location of the first terminal in the display information; or in response to determining the matching word segment, obtaining a calendar event of the user of the first terminal, and including the calendar event of the user of the first terminal in the display information;

displaying the display information;

receiving a first input from the user of the first terminal, the first input including a selection of the two or more candidate answers;

displaying by the first terminal a second input entered by the user of the first terminal;

prior to sending the first input to the second terminal, generating by the first terminal a broadcast link based on the second input; and sending to the second terminal both the first input including the selection of the two or more candidate answers and the broadcast link generated based on the second input.

8. The method according to claim 7, wherein the two or more candidate answers are correspondingly determined based on the interaction information.

9. The method according to claim 7, wherein:

the interaction information includes entered-on-screen information and/or non-entered-on-screen information, and the entered-on-screen information includes information in a window and/or information in a sending region.

10. The method according to claim 9, wherein:

the non-entered-on-screen information includes at least one of an input character string, a dividing result of the input character string, and a candidate obtained by a corresponding conversion process based on the dividing result of the input character string.

11. The method according to claim 10, further comprising at least one of:

receiving the input character string, and including the input character string in the non-entered-on-screen information;

dividing the input character string to obtain a dividing result, and including the dividing result in the non-entered-on-screen information; and performing the conversion process on the dividing result corresponding to the input character string to obtain the candidate, and including the candidate in the non-entered-on-screen information.

12. The method according to claim 7, wherein:

the display information further includes vertical search information, and the vertical search information includes at least one of webpage-searching information, product-recommending information, multi-media information, application-recommending information, weather information, map information, and stock information.

13. The method according to claim 7, wherein obtaining display information corresponding to the matching word segment includes at least one of:

obtaining the display information corresponding to the matching word segment locally from the first terminal; and uploading the matching word segment to a server, and receiving from the server the display information corresponding to the matching word segment.

14. The method according to claim 7, wherein displaying the display information includes at least one of:

recommending the display information according to a preset triggering condition that matches the interaction information in an associative region or a candidate region of an input method; and displaying the displaying information in a recommendation display region of a corresponding application.

15. The method according to claim 7, further comprising:

performing entered-on-screen display of the display information according to a triggering command: or obtaining the display information according to the triggering command, and displaying the display information in an application of instant messaging or short messaging; or executing one of displaying the display information in the application of instant messaging or short messaging, and invoking a third-party application to display the display information.

16. The method according to claim 15, wherein:
the interaction information includes information in a sending region, and
performing entered-on-screen display of the display information according to the triggering command further includes:
based on the triggering command, entering the display information and the information in the sending region on screen for display in the application of instant messaging or short messaging.

17. A device, comprising: a memory for storing one or more programs; and one or more processors for executing instruction codes included in the one or more programs to carry out following operations:
receiving, by a first terminal, interaction information sent from a second terminal via instant messaging or short messaging;
upon receipt of the interaction information at the first terminal and without entry of any input from a user of the first terminal, determining a matching word segment based on the interaction information;
obtaining display information corresponding to the matching word segment, wherein the display information includes two or more candidate answers to a question, and the two or more candidate answers are selectable at the first terminal, and wherein the display information includes at least one of key information, local relating information, an emoji, and symbol information, wherein obtaining display information further comprises one or more of:
in response to determining the matching word segment, invoking an address book of the first terminal to obtain a contact's name or phone number, and including the contact's name or phone number in the display information; or
in response to determining the matching word segment, obtaining a geographical location of the first terminal, and including the geographical location of the first terminal in the display information; or
in response to determining the matching word segment, obtaining a calendar event of the user of the first terminal, and including the calendar event of the user of the first terminal in the display information;
displaying the display information;
receiving a first input from the user of the first terminal, the first input including a selection of the two or more candidate answers;
displaying by the first terminal a second input entered by the user of the first terminal;
prior to sending the first input to the second terminal, generating by the first terminal a broadcast link based on the second input; and
sending to the second terminal both the first input including the selection of the two or more candidate answers and the broadcast link generated based on the second input.

18. The method according to claim 17, wherein displaying the display information includes at least one of:
recommending the display information according to a preset triggering condition that matches the interaction information in an associative region or a candidate region of an input method; and
displaying the displaying information in a recommendation display region of a corresponding application.

19. The method according to claim 17, further comprising:
performing entered-on-screen display of the display information according to a triggering command: or
obtaining the display information according to the triggering command, and displaying the display information in an application of instant messaging or short messaging; or
executing one of: displaying the display information in the application of instant messaging or short messaging, and invoking a third-party application to display the display information.

20. The method according to claim 1, wherein the display information includes the key information, the key information includes entered-on-screen information and non-entered-on-screen information, a key term included in the key information belongs to the entered-on-screen information of the key information, and a meaning of the key term belongs to the non-entered-on-screen information of the key information, the method further comprising:
retrieving, by the first terminal, a preset triggering condition either locally from the first terminal or remotely from a server in communication with the first terminal, the preset triggering condition correlating key terms and matching word segments; and
screening, by the first terminal, the preset triggering condition for a matching word segment that matches the non-entered-on-screen information of the key information.

* * * * *